United States Patent
Mora et al.

(10) Patent No.: US 8,392,631 B1
(45) Date of Patent: Mar. 5, 2013

(54) METHODS AND APPARATUS FOR TRANSMITTING DATA STREAMS VIA A HETEROGENEOUS NETWORK

(75) Inventors: Matthew Xavier Mora, Fremont, CA (US); Ashley Ian Butterworth, Normanhurst (AU); Andrew Yanowitz, Ben Lomond, CA (US); Niel David Warren, Soquel, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/572,995

(22) Filed: Oct. 2, 2009

Related U.S. Application Data

(60) Provisional application No. 61/195,141, filed on Oct. 2, 2008.

(51) Int. Cl.
*G06F 13/00* (2006.01)
*G06F 15/16* (2006.01)

(52) U.S. Cl. .................... 710/33; 709/228; 709/246

(58) Field of Classification Search .................. 709/227, 709/228, 230, 231, 232, 246; 710/1, 2, 30, 710/33, 62, 65, 100, 104, 105, 107, 113, 710/117, 118, 119, 124, 125, 305, 306, 311, 710/313
See application file for complete search history.

(56) References Cited

U.S. PATENT DOCUMENTS

| | | | |
|---|---|---|---|
| 5,339,413 A * | 8/1994 | Koval et al. | 719/314 |
| 7,542,474 B2 * | 6/2009 | Stone et al. | 370/401 |
| 7,730,230 B1 | 6/2010 | Kondapalli | |
| 7,751,439 B2 | 7/2010 | Elkolli et al. | |
| 7,839,872 B2 | 11/2010 | Diab et al. | |
| 7,860,011 B2 | 12/2010 | Oren et al. | |
| 7,991,907 B2 | 8/2011 | Parnafes et al. | |
| 8,036,214 B2 | 10/2011 | Elliott et al. | |
| 2006/0227753 A1 | 10/2006 | Vleugels et al. | |
| 2009/0248918 A1 | 10/2009 | Diab et al. | |
| 2010/0260173 A1 | 10/2010 | Johnson | |
| 2010/0303260 A1 | 12/2010 | Stieler von Heydekampf et al. | |

* cited by examiner

*Primary Examiner* — Chun-Kuan Lee
*Assistant Examiner* — Richard B Franklin
(74) *Attorney, Agent, or Firm* — Gazdzinski & Associates, PC

(57) ABSTRACT

Methods and apparatus that enable a community of devices having differing underlying protocols to stream media data such as video or audio data. In one exemplary embodiment, this invention enables IEEE 1394-compliant ("FireWire") enabled) devices to communicate across an Ethernet infrastructure, such as one enabled by the Ethernet AVB Standard(s). This enhances connectivity, and also supports obviating one or more physical ports within the device(s). In another embodiment, or more wireless transports are utilized.

19 Claims, 12 Drawing Sheets

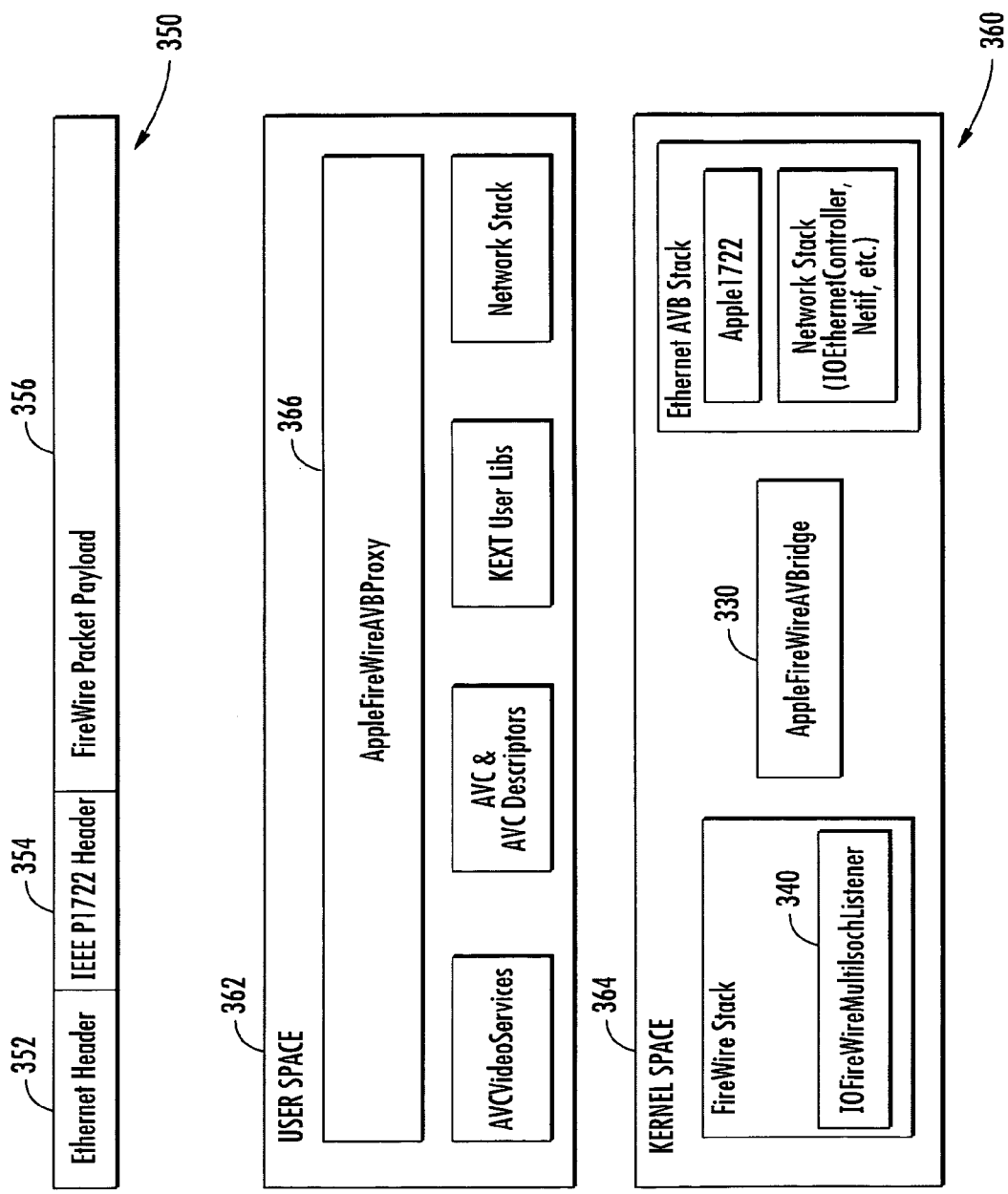

METHODS AND APPARATUS FOR TRANSMITTING DATA STREAMS VIA A HETEROGENEOUS NETWORK

PRIORITY

This application claims priority to U.S. Provisional Patent Application Ser. No. 61/195,141 filed Oct. 2, 2008 of the same title, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of data networks and device data sharing. More particularly, in one exemplary aspect, the present invention is directed to methods and apparatus enabling a heterogeneous community of devices (e.g., those which operate according to a FireWire or Ethernet AVB protocol) to interoperate seamlessly and transfer data and media (e.g., audio and video) there between.

2. Description of Related Technology

Modern electronic equipment has greatly enhanced the quality of life for many. However, as the use of such equipment has increased, so has the need to connect equipment of differing types purchased from different manufacturers. For example, while a computer and a digital camera may each be useful when used alone, the ability to connect the digital camera to the computer and exchange information (e.g., photos, video) between the two makes the combination even more useful. Therefore, a need was apparent for a serial bus standard that would allow for the connection and communication between such devices.

The IEEE 1394-1995 standard (and its associated trade names "FireWire™" (Apple Inc.), "i.LINK" (Sony), and "Lynx" (Texas Instruments), etc.) was developed to satisfy this need. This standard revolutionized the consumer electronics industry by providing a serial bus management system that featured high speeds and the ability to "hot" connect equipment to the bus; that is, the ability to connect equipment without first turning off the existing connected equipment. Since its adoption, the IEEE 1394-1995 standard has seen acceptance in the marketplace with many major electronics and computer manufacturers providing IEEE 1394-1995 connections on equipment that they sell. Several variants of IEEE 1394 have also been developed and widely deployed which improve and enhance various system characteristics (including e.g., higher speeds and longer connection paths).

In addition to IEEE 1394 based standards, a new standard being proposed at the time of the filing of the present application is herein referred to as the "Ethernet AVB standard". Ethernet AVB is a new standard being developed for transmitting audio and video data across an 802.1 Ethernet link. Existing Ethernet standards guarantee packet delivery; Ethernet AVB is expected to provide additional capabilities enabling isochronous data transfer. Specifically, Ethernet AVB provides guarantees on maximum latency and minimum bandwidth that enable "streaming" applications, which were previously limited due to requirements for low latency isochronous transfer of audio and video.

Unsatisfied Need for Interoperability

Due to the widespread existing deployments of existing IEEE 1394 devices, and the virtually universal Ethernet infrastructure, a solution for providing interoperability for the two standards seamlessly (with respect to various types of media) would greatly enhance the overall utility of both. Such a solution does not currently exist.

Another issue relates to the increasing "disappearance" of physical ports on hardware devices such as computers, video cameras, etc. over time. These physical ports (including FireWire ports) are becoming less prolific on new generation devices because, inter alia, aggressive form factor reductions no longer allow distinct connectors for all supported I/O technologies. Thus, physical space for the port and the extra cost of the port make it a strong candidate for removal. For example, in the MacBook Air product manufactured by the Assignee hereof, connectors include only a USB port, power port and a video port. Neither a physical FireWire port nor Ethernet port are present on the device. As the number of (FireWire and other) ports disappear, so do the connectivity opportunities for devices using that port specification. Hence, in order to maintain FireWire support and distribution over such devices, other "ways off of" and "ways onto" the device are needed.

Accordingly, improved methods and apparatus are needed for providing data stream delivery between two differing protocols, such as for example Ethernet AVB, and IEEE 1394. Such an improved solution should operate seamlessly and without adversely impacting user experience on existing apparatus. Moreover, such "multi-lingual" data stream delivery would be operable without requiring undue hardware or other modification to implementations already deployed. To these ends, such data delivery schemes should minimally support "master-slave" operation, where a dynamically bridging multi-lingual device performs all translation for its localized network, without requiring its non-enabled slave devices to do so.

Multiple clients would also advantageously work cooperatively to simultaneously source and sink isochronous datastreams, each independently capable of additionally splitting or merging multiple isochronous data streams.

Lastly, such improved apparatus and methods would enable the use of IEEE 1394-compliant devices across any geography or topology, such as by piggybacking on existing Ethernet infrastructure.

SUMMARY OF THE INVENTION

The present invention satisfies the foregoing needs by providing, inter alia, improved apparatus and methods for bridging data (including audio and video or other multimedia data) across networks or devices using different protocols.

In one aspect of the invention, a method for sending a message from a source device to a target device is disclosed. In one embodiment, the message is sent via a fabric or other intermediary architecture, and said source device operates with a first protocol, and said fabric operates with a second protocol, said first and second protocols being different. The method comprises: associating said source device with a software entity; associating said target device with said software entity; responsive to said associations of said source device and said target device, negotiating one or more parameters related to data stream requirements; receiving at least one message compliant with said first protocol from said source device; formatting said at least one messages to be compliant with said second protocol, and said negotiated one or more parameters; and transmitting said formatted at least one messages via said fabric.

In one variant, said source device and fabric are characterized by isochronous transfer parameters.

In another variant, the first protocol comprises a 1394-compliant protocol, and the second comprises an Ethernet AVB compliant protocol.

In a second aspect of the invention, a source device adapted for isochronous data transfer is disclosed.

In a third aspect of the invention, a transfer medium adapted to facilitate media/data transfer between different protocol environments is disclosed. In one embodiment, the medium comprises a fabric capable of connecting 1394.1 bridge portals and that is capable of transferring any serial bus subaction from one portal to its co-portal, and that supports bidirectional, non-blocking transfer of asynchronous request subactions, asynchronous response subactions, and isochronous subactions.

In a fourth aspect, a computer readable medium comprising at least one computer program adapted transfer media/data between different protocol environments is disclosed.

In a fifth aspect of the invention, a client device adapted to run the aforementioned program is disclosed. In one variant, the client device comprises a desktop or portable computer. In another variant, the client device comprises a personal media device or PDA. In yet another embodiment, the device comprises a network router, such as a home LAN or switch or router.

In a sixth aspect of the invention, a portal architecture is disclosed. In one embodiment, the portals comprise 1394.1-compliant portals disposed on each side of an Ethernet AVB network, and which employ AVC command interpreters. This approach allows existing FireWire software to "see" FireWire devices that are not physically connected to the local FireWire bus (or if there is no local FireWire bus at all).

In a seventh aspect of the invention, one or more wireless protocols are utilized as the bearer(s) for the transported media content.

In an eighth aspect of the invention, business models and associated methods of doing business are disclosed.

BRIEF DESCRIPTION OF THE DRAWINGS

FIG. 3A is a graphical illustration of one embodiment of a data packet structure according to the invention.

FIG. 3B is a high layer representation of one exemplary embodiment of a software system comprising a user and kernel space, according to the present invention.

DETAILED DESCRIPTION OF THE INVENTION

Figure 1:
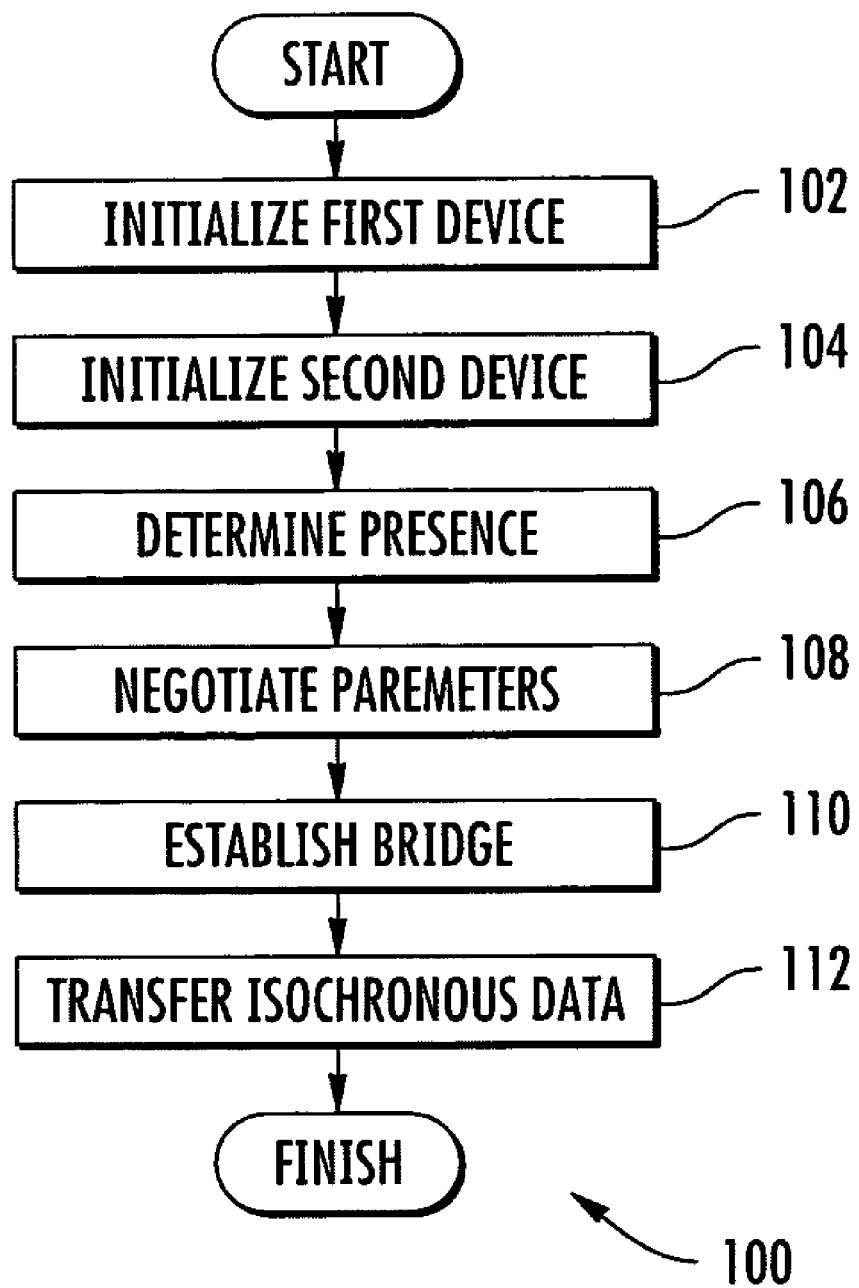
FIG. 1 is a logical flow diagram illustrating one embodiment of the generalized method of transferring data across a heterogeneous protocol environment according to the invention.

Reference is now made to the drawings, wherein like numerals refer to like parts throughout.

As used herein, the terms "client device", "end user device" and "user equipment" or "UE" include, but are not limited to cellular telephones, smartphones (such as for example an iPhone™), personal computers (PCs), such as for example an iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), such as for example an iPod™, or any combinations of the foregoing.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the terms "Ethernet AVB" and "Ethernet AVB Standards" refer, without limitation, to any one or more of the following as applicable: (i) IEEE Std. P1722; (ii) IEEE Std. P802.1AS; (iii) IEEE Std. P802.1Qat; (iv) IEEE Std. P802.1Qav; (v) IEEE Std. P802.1AB; (vi) IEEE Std P802.1BA; (vii) IEEE Std. P1722; and (viii) IEEE Std. 1394TA 2006021, each of the foregoing being incorporated herein by reference in its entirety.

As used herein, the terms "IEEE 1394" and FireWire" refer without limitation to any one or more of the following as applicable: (i) IEEE Std. 1394-1995; (ii) IEEE Std. 1394a-2000 amendment; (iii) IEEE Std. 1394b-2002 amendment; and (iv) IEEE Std. 1394c-2006 amendment, each of the foregoing being incorporated herein by reference in its entirety.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, ATM, X.25, Frame Relay, 3GPP, 3GPP2, WiMAX, WAP, SIP, UDP, FTP, RTP/RTCP, H.323, etc.).

As used herein, the terms "network interface" or "interface" typically refer to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), WiMAX (802.16), PAN (802.15), IrDA or other wireless families.

As used herein, the term "wireless" means any wireless signal, data, communication, or other interface including without limitation Wi-Fi (IEEE Std. 802.11), Bluetooth, 3G (3GPP, 3GPP2, UMTS), HSDPA/HSUPA, TDMA, CDMA (e.g., IS-95A, WCDMA, etc.), FHSS, DSSS, GSM, PAN (IEEE Std. 802.15), WiMAX (IEEE Std. 802.16), MWBA (IEEE Std. 802.20), narrowband/FDMA, OFDM, LTE, PCS/DCS, analog cellular, CDPD, satellite systems, millimeter wave or microwave systems, acoustic, and infrared (i.e., IrDA).

As used herein, the terms "WLAN" and "wireless LAN" refer generally to any system wherein a wireless or air interface is employed between two devices, and which provides at least local area networking capability. Wi-Fi systems are one exemplary instance of WLANs.

Overview

In one aspect, the present invention discloses, inter alia, methods and apparatus that enable a community of heterogeneous isochronous devices having differing underlying protocols to stream data such as video or audio data. In one exemplary embodiment, this invention enables IEEE 1394-compliant ("FireWire" enabled) devices to communicate across an Ethernet infrastructure, such as one enabled by the recent Ethernet AVB Standard(s).

In one variant, the invention enables an IEEE 1394 device to stream data to an Ethernet AVB-compliant device (or vice versa).

In another variant, an IEEE 1394 device may stream data to another IEEE 1394 device via an Ethernet AVB-compliant fabric.

In a second alternate embodiment, this invention enables IEEE 1394-compliant ("FireWire" enabled) devices to communicate across a wireless network infrastructure, such as one enabled by IEEE 802.11 (Wireless Local Area Networks).

In another aspect, methods and apparatus are disclosed which enable flexible connection management for an isochronous system having multiple sources and targets (e.g. an audio network). In one embodiment, such flexible connection management is provided for without regard to the direction or distribution of datastreams.

In yet another aspect of the invention, an implementation-dependent data "fabric" is disclosed. In one embodiment, the fabric is adapted for compliance with IEEE 1394.1 bridging requirements, and comprises apparatus adapted to interconnect the 1394.1 bridge portals that is capable of transferring any serial bus subaction from one portal to its co-portal, and that supports bidirectional, non-blocking transfer of asynchronous request subactions, asynchronous response subactions, and isochronous subactions.

In one variant, the fabric is limited in geographical extent (e.g., the bridge portals and fabric are each located within a common device enclosure or even on a common substrate or module within the device).

In another variant, the fabric is physically extensive (e.g., the bridge's portals are located in more disparate locations, such as in separate rooms of a house, or even in separate buildings).

In a second alternate embodiment, the fabric is adapted for wireless operation. In one such embodiment, the fabric is adapted for compliance with WEE 802.11 (Wireless Local Area Networks).

Advantageously, the methods and apparatus of the exemplary embodiment of the present invention are agnostic (work with) any of the variants of the FireWire 1394 standard.

DETAILED DESCRIPTION OF EXEMPLARY EMBODIMENTS

Exemplary embodiments of the present invention are now described in detail. While these embodiments are primarily discussed in the context of an isochronous network of devices having differing protocols, and more specifically to a heterogeneous network of IEEE 1394-compliant and Ethernet AVB devices, it will be recognized by those of ordinary skill that the present invention is not so limited, and in fact may be used in other types of applications, and with different protocols.

The following brief discussion of standards and their associated descendents is useful for understanding one or more aspects of the present invention.

Ethernet AVB

So-called "Ethernet AVB Standards" include: (i) IEEE Std. P1722—Streaming Transport; (ii) IEEE Std. P802.1AS; (iii) IEEE Std. P802.1Qat; (iv) IEEE Std. P802.1Qav; (v) IEEE Std. P802.1AB; (vi) IEEE Std P802.1BA; (vii) IEEE Std P802.1BA; and (viii) IEEE Std. 1394TA 2006021, each of the foregoing which are incorporated herein by reference in their entirety.

IEEE 1394-1995

As of 2007, IEEE 1394 was a composite of four documents: the original IEEE Std. 1394-1995, the IEEE Std. 1394a-2000 amendment, the IEEE Std. 1394b-2002 amendment, and the IEEE Std. 1394c-2006 amendment. On Jun. 12, 2008, all these amendments as well as errata and some technical updates were incorporated into a superseding standard IEEE Std. 1394-2008.

IEEE 1394-1995 ("FireWire 400")

FireWire 400 can transfer data between various interconnected devices at data rates of 100, 200, or 400 Mbps half-duplex data rates (the actual transfer rates are 98.304, 196.608, and 393.216 Mbps. These different transfer modes are commonly referred to as S100, S200, and S400. Under this standard, cable length is also limited, although several cables can be daisy-chained using repeaters, hubs, etc. often present in FireWire equipment (although there is a maximum "total" chained length limitation also).

IEEE 1394a-2000

An amendment to the original standard (IEEE 1394a) was released in 2000 which both clarified and enhanced the original specification. Support for asynchronous streaming was added, as was faster bus reconfiguration, packet concatenation, and a power-conserving "suspend" mode of operation. 1394a also standardized use of the 4-pin (non-power) connector.

IEEE 1394b-2002 ("FireWire 800")

FireWire 800 or S800 was introduced commercially by Apple Inc. in 2003. This newer (1394b) specification allows a transfer rate of 786.432 Mbps full-duplex via a new encoding scheme often referred to as "beta" mode. It is backwards compatible to the slower rates of FW400 described above. However, while the IEEE 1394a and IEEE 1394b standards are compatible, FireWire 800's connector is different from FireWire 400's connector, making the cables incompatible. A "bilingual" cable is available which allows the connection of legacy devices to the new port.

The 1394b specification supports data rates up to 3200 Mbit/s (S1600 and S3200) over beta-mode or optical connections up to 100 meters in length. Standard CAT-5e unshielded twisted pair supports 100 meters at S100. The original 1394/1394a standards used data/strobe (DIS) encoding (called legacy mode) on the signal wires, while 1394b added a new data encoding scheme called 8B10B.

IEEE 1394c-2006 ("FireWire S800T")

IEEE 1394c-2006 was published on Jun. 8, 2007, and provides several changes including: (i) a new port specification which provides 800 Mbit/s over the same RJ45 connectors with CAT-5e cable which is specified in IEEE 802.3 clause 40 (gigabit Ethernet over copper twisted pair); (ii) automatic negotiation that allows the same port to connect to either IEEE Std 1394 (FireWire) or IEEE 802.3 (Ethernet) devices.

IEEE Std. 1394.1

FireWire bridging (IEEE 1394.1) was designed to support longer distances and more devices on a network. Currently, 63 devices is the maximum number of devices allowed on a single FireWire bus. The 1394.1 bridging allows the connection of multiple busses for expanding the number of devices. Also, by expanding the number of busses, the maximum distance between devices can be expanded as well. IEEE 1394.1 defines a "bridge" as consisting " . . . of two bridge portals (each with its associated PHY and link), queues (FIFOs) for asynchronous and isochronous subactions (which collectively form an implementation-dependent fabric between the two portals), cycle timers, route maps, and configuration ROM." However, it is appreciated that the foregoing definition is implementation specific, and the present invention is in no way so limited. More broadly, as used throughout, the term "bridging", "bridge", etc. refers to the physical and logical apparatus necessary to connect a first network technology to a second network technology. Such methods and apparatus may be physical (e.g., hardware/firmware implementations), logical (e.g., software implementations), or any combination thereof.

In addition to the foregoing standards and protocols, others have been adopted (or are under development) which relate to A/V transmission:

IEEE Std. 802.1Qat

IEEE Std. 802.1Qat ("Standard for Local and Metropolitan Area Networks—Virtual Bridged Local Area Networks—Amendment: 9: Stream Reservation Protocol (SRP)"), which is incorporated herein by reference in its entirety, provides for reservation of bandwidth on the network (including between end stations through a number of bridges). A "listener" requests bandwidth to a "talker" and bridges ask each other along the chain if there is sufficient bandwidth to support adding the stream.

IEEE Std. 802.1Qav

IEEE P802.1Qav ("IEEE Standard for Local and Metropolitan Area Networks—Virtual Bridged Local Area Networks—Amendment: Forwarding and Queuing Enhancements for Time-Sensitive Streams"), which is incorporated herein by reference in its entirety, specifies how to queue packets to not burst traffic across the network. Bridges are used to automatically shape traffic.

IEEE Std. 802.1AB

IEEE Std. 802.1AB ("Station and Media Access Control Connectivity Discovery—Apr. 5, 2005"), which is incorporated herein by reference in its entirety, discloses Link Layer capability discovery; i.e., discovery of what capabilities the ends of the link have. This protocol may be used to tell end stations what priority to send class-A and class-B traffic, and may be used by some bridges to enable AVB functionality.

IEEE Std P802.1BA

IEEE Std P802.1BA ("Audio Video Bridging (AVB) Systems—Draft PAR—Feb. 1, 2008), which is incorporated herein by reference in its entirety, discloses profiles that select features, options, configurations, defaults, protocols and procedures of bridges, stations and LANs that are necessary to build networks that are capable of transporting time sensitive audio and/or video data streams.

IEEE Std. 1394TA 2006021

IEEE Std. 1394TA 2006021 ("Networking IEEE 1394 Clusters via UWB over Coaxial Cable—Part 3: FCP and CMP over IPv4"), which is incorporated herein by reference in its entirety, describes discovering and controlling device configurations, and connection management. It is based on the 1394 TA Specifications, and uses (i) UDP/IP for communications, and (ii) Bonjour™ protocol for discovery and removal notifications.

IEEE Std. 802.1AS and "AppleAS"

IEEE Standard 802.1AS ("IEEE Standard for Local and Metropolitan Area Networks—Timing and Synchronization for Time-Sensitive Applications in Bridged Local Area Networks"), which is incorporated herein by reference in its entirety, provides mechanisms for synchronizing frequency of clocks, and for measuring the propagation delay across a link. It also provides a NIC-to-bridge interface in bridged network, and NIC-to-NIC in a two-machine network. It is based on IEEE 1588, and requires ingress/egress time stamping in the MAC (i.e., Sync, PDelay_Request, and PDelay_Response frames time-stamped on egress and ingress).

The AppleAS protocol is an implementation of the IEEE 802.1AS protocol developed in interest of the Assignee. The functionality of AppleAS is described in greater detail herein. Briefly, AppleAS comprises an abstraction layer that isolates the vendor code from differences in Ethernet AVB hardware, and can still function without dedicated hardware (though at a reduced precision of time synchronization). It resolves or reconciles the IEEE 801.1 AS clock with the resident system's CPU clock, such that the software can relate system time to network time, and vice versa. In one implementation, the protocol is implemented in NIC hardware, and is IEEE 802.1AS-compliant. In another implementation, only the hardware time stamping is applied in the hardware, and IEEE-802.1AS protocol is implemented in software.

Extension of FireWire "Bridging"—

The FireWire™ protocol allows for high-speed data transfer between two or more devices. The protocol can maximally support sixty-three (63) devices on a single FireWire bus. FireWire bridging according to IEEE 1394.1 allows the connection of multiple busses for expanding the number of devices. The bridging component is described within the IEEE 1394.1 specification as being comprised of: (i) a serial bus bridge; (ii) two bridge portals (each with its associated PHY and link), (iii) queues (FIFOs) for asynchronous and isochronous subactions (which collectively form an implementation-dependent fabric between the two portals), (iv) cycle timers, (v) route maps, and (vi) configuration ROM.

In one embodiment, the present invention provides such an "implementation-dependent fabric" using an Ethernet AVB cloud. As used herein, an AVB "cloud" refers to a collection of AVB devices that support all the AVB protocols. Any legacy Ethernet device added to an AVB switch would terminate the cloud at that port. Accordingly, AVB devices may exist which are not a part of the "cloud" structure (e.g. legacy AVB devices, etc.).

The exemplary fabric is adapted for compliance with IEEE 1394.1 bridging requirements, and comprises apparatus adapted to interconnect the 1394.1 bridge portals that is capable of transferring any serial bus subaction from one portal to its co-portal. The fabric also supports bidirectional, non-blocking transfer of asynchronous request subactions, asynchronous response subactions, and isochronous subactions.

Previous software implementations of FireWire-based audio have typically had similar topologies to Universal Serial Bus (USB) "Host-to-device" models, due to the relatively inconvenient nature of physically wiring complex networks, despite FireWire device capabilities. By augmenting the FireWire capabilities with Ethernet AVB, and the corresponding ubiquitous Ethernet infrastructure, such limitations are advantageously removed. Thus, while prior art implementations may implement a single centralized supervisory computer; the peer-to-peer nature of the FireWire/Ethernet AVB bus is not so limited. Hence, in another aspect of the present invention, the functionality between connection management and datastream management is logically separated.

Such additional flexibility enables multiple additional use case scenarios. In one embodiment, a FireWire network with multiple connection managers (e.g., computers) and one or more devices (e.g., speakers, microphones, iPods, etc.) may have any number of conveniently selectable interconnections and topologies.

In another embodiment, a connection manager (e.g. computer) may be separate from a data source/sink (e.g., Home Theater Receiver, etc.).

In yet another embodiment, the merging and splitting of data sources can be separated from connection management. Similarly, the connection management can be performed in isolation from the data being routed between the devices (e.g., data is not routed within the connection manager).

Methods—

Referring now to FIG. 1, a first embodiment of the generalized process 100 for integrating an isochronous network of devices having differing networking protocols according to the present invention is described.

At step 102, a first isochronous network having at least one first device capable of operating with at least a first and a second protocol interfaces is initialized, and connects to an interconnection fabric which utilizes its second protocol interface. The initialization procedures may comprise for example registration with a local or remote software entity, such as a network daemon described hereinafter.

In one embodiment, the first protocol interface is an IEEE 1394.1-compliant interface, and the second protocol interface is an Ethernet AVB interface. The interconnection fabric comprises an Ethernet AVB-compliant network cloud.

At step 104, an external device operating with at least a second protocol interface is initialized, and connects to the interconnection fabric utilizing its second protocol interface. In one embodiment, the external or second device additionally comprises a first protocol interface (not physically connected to the first device); the second device is physically connected to a target isochronous device via its first protocol interface (wherein the term "target" is applied for clarity rather than to indicate direction of data transfer). The target device can also be part of the second device.

At step 106, the first device determines the existence of the second device. In one embodiment, such identification is accomplished via a software entity, such as a software daemon. The identification is performed local to either the first and or the second device. In an alternate embodiment, such identification is performed at a third party connection management entity.

At step 108, the first device negotiates one or more isochronous parameters to connect with the second device. In one embodiment, such isochronous parameters may comprise for example: (i) audio sample formats, (ii) sample rates, and (iii) channel numbers, etc.

A source isochronous device in logical connection with the first device via the first device's first protocol interface receives (or transmits) an isochronous data stream to the target isochronous device (wherein the term "source" is applied for clarity rather than as an indication of data transfer).

At step 110, the first and second devices provide a logical bridge between the first and second differing isochronous protocols. In one embodiment, the management of the first and second devices and corresponding source and target nodes is performed within a graphical user interface (GUI) or other such mechanism well known to those of ordinary skill in the computer arts.

At step 112, isochronous data is transferred via the logical bridge. In one variant, the isochronous data stream transferred comprises at least one stream of audio and/or video. Multiple source and target devices may exist, each receiving and or transmitting at least one stream of audio, and or video.

Apparatus—

Figure 2:
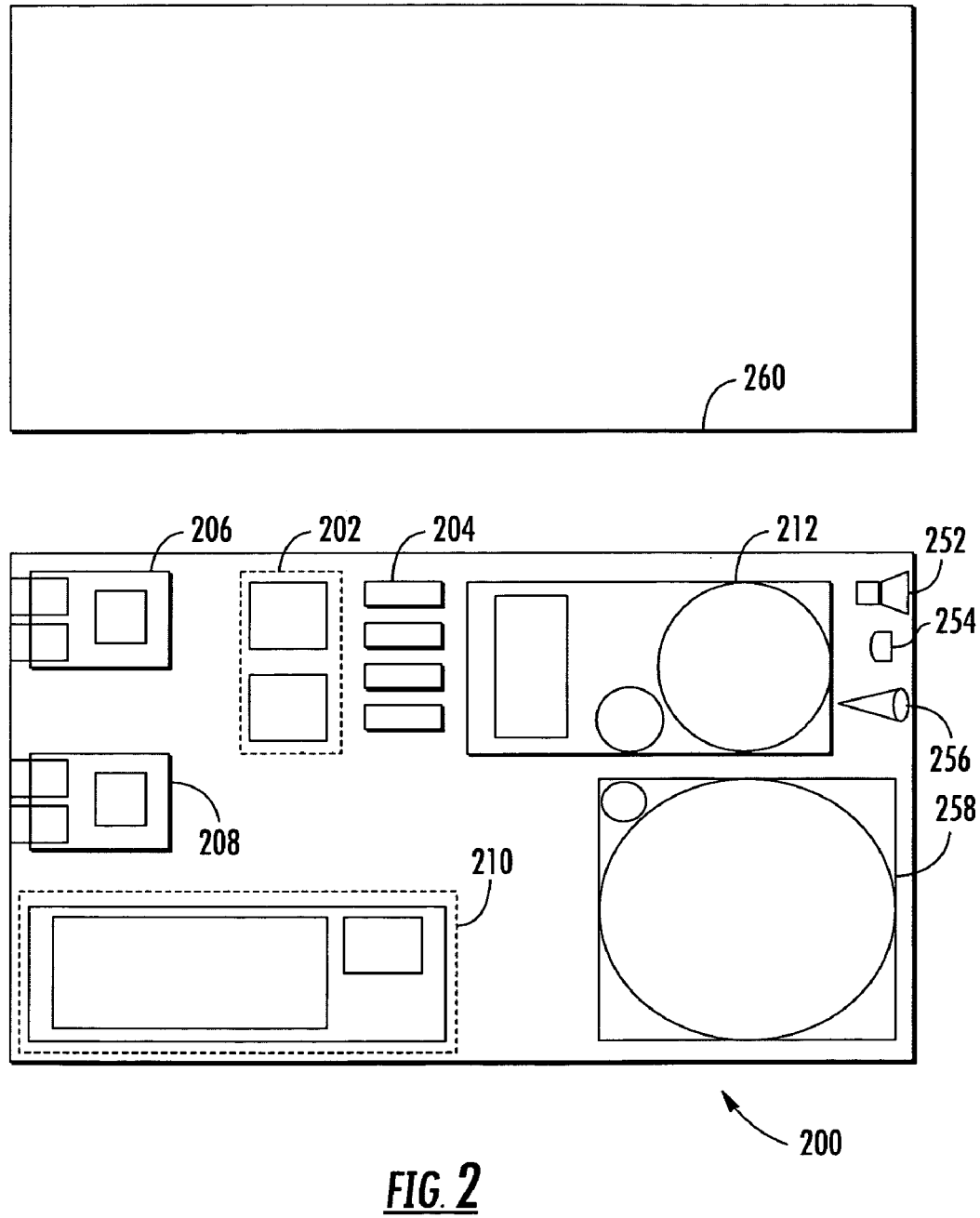
FIG. 2 is block diagram illustrating one embodiment of an apparatus adapted to transfer data across a heterogeneous protocol environment.

Referring now to FIG. 2, an exemplary apparatus 200 useful in implementing the methods of the present invention is illustrated. While a specific device configuration and layout is shown and discussed, it is recognized that other implementations can be readily implemented by one of ordinary skill given the present disclosure. For example, various components may be divided and/or placed within other devices, integrated into one physical form factor, etc.

The illustrated embodiment of the apparatus 200 comprises a device such as a portable (laptop or handheld) computer, or audio/video capture, or synthesis system capable of receiving or transmitting an isochronous datastream across two or more differing protocols. In one exemplary implementation, the multi-lingual functionality is performed within a dedicated processing device coupled to physical connectors for each protocol (e.g., a IEEE 1394 connector and an 802.3 Ethernet connector accessible on the back of the device), distributed throughout the equipment enclosure, as described in greater detail subsequently herein.

As shown in FIG. 2, the apparatus 200 comprises a processing subsystem 202, operational memories 204, a first physical connector 206 corresponding to a first protocol, and a second physical connector 208 corresponding to a second protocol, and a power subsystem 210. In one exemplary embodiment, the first physical connection corresponds to a FireWire (IEEE 1394) multi-pin interface (whether 4-pin, 6-pin, or otherwise), and the second physical connection corresponds to an Ethernet AVB interface (e.g., RJ-45 connector). It will be appreciated that any number of different or similar physical connections (for example, multiple homogeneous and heterogeneous ports) may be used consistent with the invention as well.

The processing subsystem 202 comprises a central processing unit (CPU) or digital processor, such as a microprocessor, digital signal processor, field-programmable gate array, or plurality of processing components mounted on one or more substrates. The processing subsystem is tightly coupled to operational memory 204 which may include for example SRAM, FLASH and SDRAM components. The processing subsystem may also comprise additional co-processors, such as a dedicated graphics accelerator, network processor (NP), or audio processor. A direct memory access (DMA) subsystem (not shown) of the type well known in the art may also be utilized with the processor and memory in order to facilitate memory accesses. In one embodiment, a time scheduled Ethernet DMA hardware is used for scheduling Ethernet packets at the proper rate (e.g. 8000 packets per second). Normally, Ethernet DMA hardware is used when streaming data or a group of descriptors. Ethernet DMA transmits as soon as the data arrives in the hardware queues. For Ethernet AVB, Ethernet data is queued in a priority queue with "time to send" values, such that the Ethernet DMA hardware is able to schedule packets out at the proper rate and proper time.

The illustrated power management subsystem (PMS) 210 comprises a controller for power delivery and battery management (if so equipped), and/or a plurality of discrete electrical components (not shown). Additionally, a chemical battery cell such as a Lithium Ion (Li-ion), or Nickel Cadmium (Ni—Cd) battery provides power to the device apparatus when disconnected from a parent power source such as a 115 VAC wall outlet/transformer.

The illustrated mass storage subsystem 212 comprises an integrated circuit memory for storing a computer readable program, and/or a plurality of discrete electrical components (e.g. motor, controller, and hard disks, etc.). Typical embodiments of such storage subsystems are hard disk drives common to the art. Other alternate embodiments may use non-volatile solid-state memory, such as NAND/NOR FLASH, ROM, etc.

In certain embodiments, the device may further comprise one or more of target or source components. Such components consume or produce isochronous data streams. Typical embodiments may include: speakers 252, microphones 254, cameras 256, DVD and CD disk players 258, or monitors 260. Such target/source components may be integrated within the device 200, or stand-alone in nature (e.g., connected to the apparatus 200 via interposed cabling, wireless links, etc.).

In another embodiment of the invention, the apparatus comprises a network switch or router adapted to perform data transport between two devices (e.g., one operating according to a FireWire protocol, and one operating according to an Ethernet protocol). For example, in one variant, the apparatus comprises a "super hub" that includes both FireWire and Ethernet AVB ports on the hub, and which performs the translation to and from each protocol.

In still another embodiment, the apparatus comprises a removable/portable "dongle" (e.g., adapter or converter). In one variant, the dongle has a FireWire port on one end, and an Ethernet AVB port on the other. The dongle is plugged into the FireWire port or Ethernet port on one device (or is otherwise connected to the port indirectly, such as via a male/female, male/male, or female/female interconnection cable), and similarly connected at its other end to the other device. The dongle contains sufficient processing capability and software to perform the protocol "translation" described elsewhere herein. It will also be appreciated that the dongle may be configured for "one-to-many" operation (e.g., one port of a first protocol, and multiple ports for the other protocol).

Exemplary Implementation—

The following software descriptions further illustrate one exemplary embodiment useful in implementing a heterogeneous network of audio devices for providing audio and/or video stream transfers, according to the present invention. While this specific embodiment has functionality divided into kernel and user space operations, these distinctions should not be construed as limiting as these components may be implemented both in kernel space, and/or in user space.

Moreover, while the following description relates primarily focused on audio data transfer, the invention is in no way limited to audio data, and in fact may support video and other multimedia data types. Video formats supported may include for example (and without limitation) IEC 61883-x based protocols such as IEC 61883-1, 61883-3, 61883-4, 61883-6, and 61883-7). See Appendix I hereto for a listing of some relevant "video" standards that may be utilized in conjunction with the methods and apparatus of the present invention to facilitate, format and control video delivery over different bearer protocols.

Various components are used in the illustrated embodiment to provide the required functionality. Aspects of the functionality of these components are described below. The aforementioned components are also provided via a computer program listing appendix entitled "AppleAS SOURCE CODE" disclosed in Appendix II, herein incorporated in its entirety.

Ethernet 802.1 AS Driver

AppleAS kext (Kernel Extension) is one embodiment of the 802.1AS Ethernet driver. It implements the IEEE 802.1AS protocol and provides an API for mapping 802.1AS grandmaster time to Host CPU time in nanoseconds.

Figure 3:
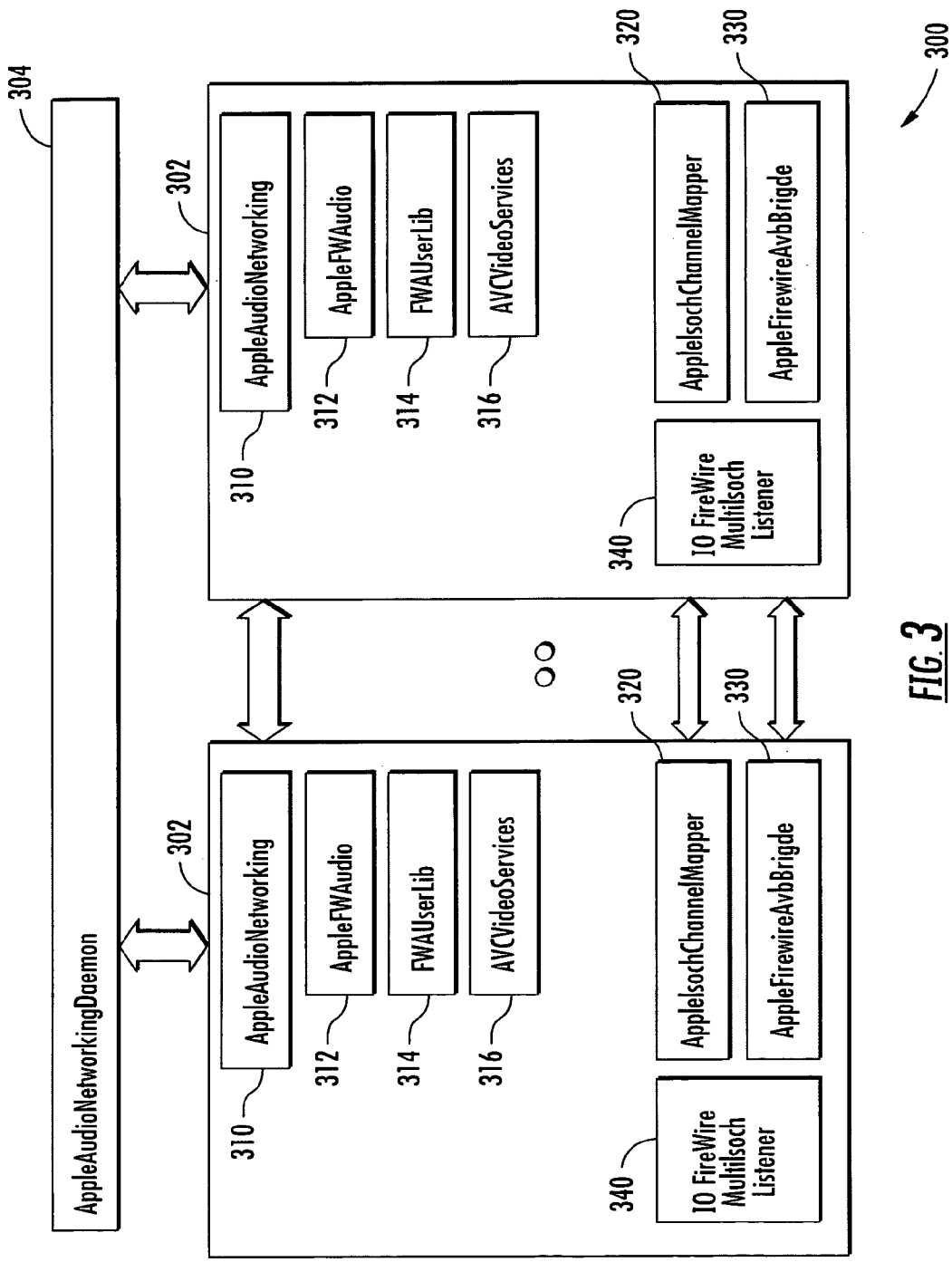
FIG. 3 is a graphical illustration of protocol stack interactions between two exemplary devices as part of the data transfer of FIG. 1.

Referring now to FIG. 3, a software system 300 is shown, useful in describing one exemplary software or protocol stack resident within a plurality of exemplary devices. As shown, each entity of the software stack 302 within each device communicates with the corresponding entities of other devices. A connection manager 304 (AppleAudioNetworkingDaemon) is also shown. The entities comprise: AppleAudioNetworking 310, AppleIsochChannelMapper Kext (Kernel Extension) 320, and AppleFireWireAVBBridge Kext 330. Two supplemental software components are also utilized: AVCDescriptors Framework (not shown), IOFireWireMultiIsochListener 340.

The daemon (AppleAudioNetworkingDaemon) 304 is responsible for performing device capability discovery, connection management and handling device communications. The daemon sits above the various kernel extensions needed for performing channel mapping, bridging and audio streaming, and the frameworks which provide device discovery, connection management calls and descriptor parsing.

The AppleAudioNetworking entity 310 provides application-level management via a graphical user interface for configuring devices and the network of devices. The application entity receives connection management information from the daemon 304. The application entity 310 is responsible for configuring kernel extensions, talking with devices and performing local device discovery. AppleAudioNetworking handles discovery and configuration aspects of the AppleFWAudio 312 driver within user space, rather than within the kernel. Drivers may be stored in operating system (OS) kernels to offload device management from higher-level software. AppleAudioNetworking handles audio device management functionality explicitly, as audio devices may not necessarily be local to the AppleAudioNetworking software.

AppleAudioNetworking further provides, in the illustrated embodiment, support for AVB (Audio Video Bridging) devices using AVC (Advanced Video Coding)-over-IP (Internet Protocol), as previously referenced herein.

AppleAudioNetworking is supplemented with three (3) components: (i) AppleFWAudio kext 312, (ii) FWAUserLib framework 314, and (iii) AVCVideoServices library 316. AppleFWAudio kext enables audio streaming. Devices are created and configured through the FWAUserLib framework with the connection management being handled with the daemon (described hereinafter). The AVCVideoServices library performs discovery of FireWire and AVC-over-IP devices, reading of device configurations, performing device communication and connection management of AVC-over-IP devices.

The IOFireWireMultiIsochListener 340 is a software function which allows multiple clients on one node to "listen in" to the same isochronous channel. The IOFireWireMultiIsochListener does not restrict the number of input isochronous contexts available. While the IOFireWireMultiIsochListener may perform basic formatting operations (e.g., modifying headers, address translation, etc) to service various clients, it does not alter the datastream itself. The IOFireWireMultiIsochListener splits each isochronous channel to the AppleFWAudio, AppleFireWireAVBBridge (AFAB) Kext. AppleFWAudio, and AFAB are critical to connection management.

The AppkFireWireAVBBridge (AFAB) 330 kext performs the bridging of the local FireWire bus to an AVB network/cloud. The AFAB uses the IEC 61883/IIDC packet format of the AVBTP draft specification previously referenced herein to encapsulate the FireWire isochronous packet. The AFAB is a two-way bridge, capable of both transmitting and receiving AVB packets. The AFAB may support any number of input and output streams, each of which may have differing channel counts. A user client enables local and or remote configuration of the AFAB.

The AVCDescriptors framework (not shown) is a Foundation-based Objective-C framework that performs parsing of AVC device descriptors into an object-based hierarchy that can be easily used for getting and setting properties of the descriptors. AVCDescriptors will accept either the binary descriptor from the device or the appropriate dictionary from AVCVideoServices. The AVCDescriptors may produce a binary or dictionary version of the descriptors suitable for AVCVideoServices or programming into a device. The AVCDescriptors presents information necessary for management within a localized database, such that each FireWire node can track other FireWire, and Ethernet AVB members. In one embodiment, the AVCDescriptors is a software program for translating IEEE 1394 based AVC device descriptors into the industry standard XML format for storage or modification. AVCDescriptors additionally supports conversion from the XML format to IEEE 1394 binary descriptor format. The XML outputs of the AVCDescriptors are used by the controller to discover the capabilities and parameters of the device, including such qualities as device name, names of plugs/streams, internal routing, etc. The binary outputs of AVCDescriptors are used natively within connected IEEE 1394 compliant busses.

FIG. 3A illustrates one exemplary packet structure useful with the present invention. The illustrated packet structure comprises three components: a first header 352, a second header comprising one or more isochronous parameters 354, and a payload 356. The packet, when being bridged from one protocol to another, utilizes the first header 352 so as to comply with the "bridged to" protocol. Information is parsed from the parameters field 354, to determine any differences (e.g. sample rates) and or requirements to modify the payload. The payload 356 is packaged for use at the destination.

While the packets share the same structure regardless of the source or destination of the packet, it is appreciated that in certain embodiments one or more elements of the packet structure may require modification to accommodate differing endpoints. For example, packets from a first IEEE 1394 compliant bus transmitted into an AVB cloud will have large portions of the payload 356 filled with data when connecting to a second IEEE 1394 compliant bus via the AVB cloud. Alternately, the same payload may be considerably smaller, when being transmitted to an AVB device within the AVB cloud. Furthermore, packets from an AVB device in an AVB cloud to an IEEE 1394 compliant may have smaller payloads, and may require padding with null data by an intelligent component, such as the AVB/FireWire bridge component.

In the illustrated embodiment, the first header 352 comprises an Ethernet (IEEE Std. 802) header of the type well known in the art, while the second header comprises an IEEE P1722 header. The payload illustrated is a FireWire packet payload of the type well known in the art. It will be appreciated, however, that other packet headers and structures (as well as different protocols) may be used consistent with the invention.

FIG. 3B is a high layer representation 360 of the software system components; as shown, the system is separated between user-land (applications and APIs) 362 and the kernel (drivers) 364. AppleFireWireAVB Proxy 366 is the controlling software component that sets up the Ethernet to FireWire mapping and instantiates the components needed for the bridging of protocols.

Figure 3C:
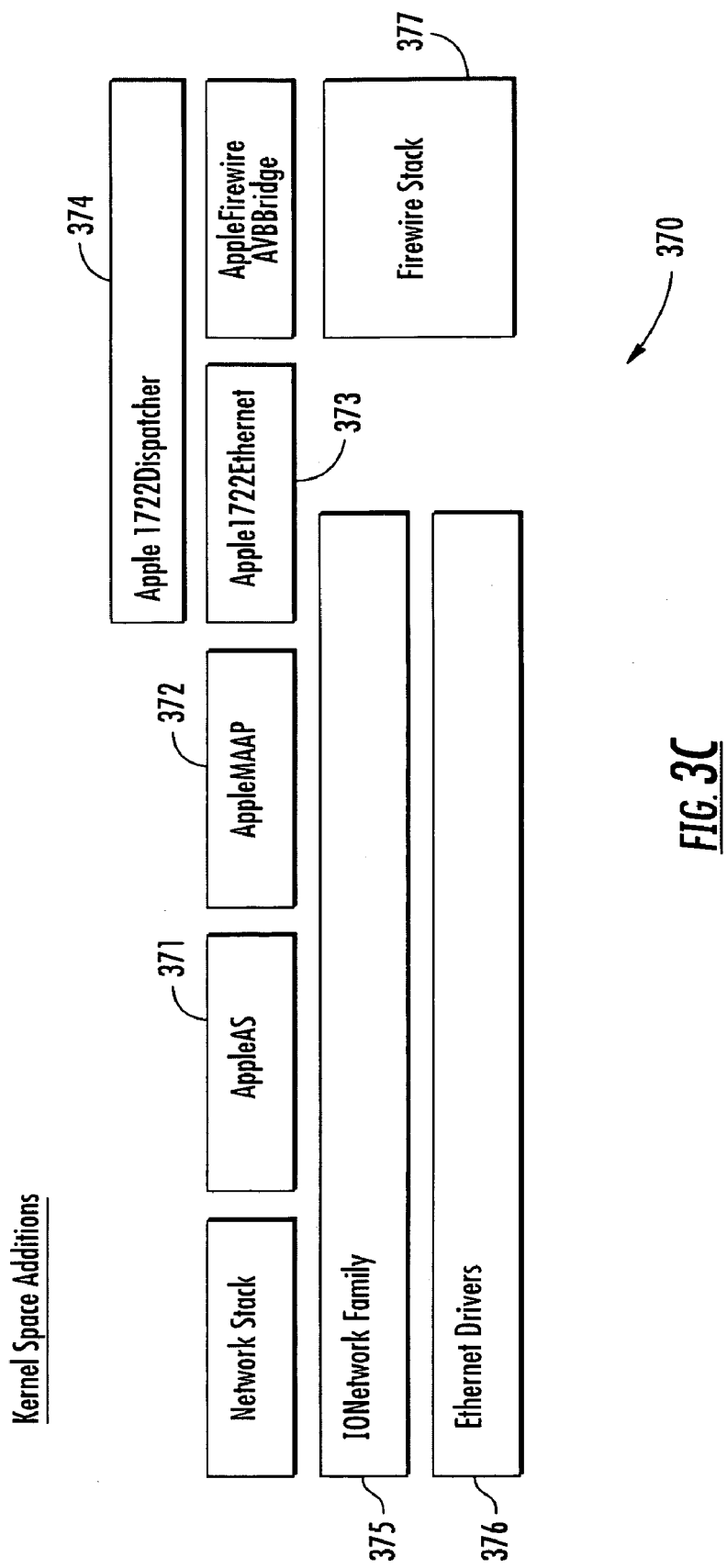
FIG. 3C is a graphical representation of one embodiment of kernel space additions useful for implementing the heterogeneous protocol data transfer functionality of the present invention.

FIG. 3C is a graphical representation of one embodiment of an exemplary protocol stack (kernel space) 370 implementing the heterogeneous protocol data transfer functionality of the present invention. The exemplary protocol stack includes the additional components: AppleAS 371, AppleMAAP 372, Apple1722Ethernet 373, Apple1722Dispatcher 374 and AppleFireWireAVBBridge. IONetworkFamily 375 and Ethernet Drivers 376 are pre-existing Ethernet protocol stack components; similarly the FireWire Stack 374 uses existing FireWire stack in the current system.

In the exemplary embodiment, the current FireWire stack, Ethernet stack, user-land API and associated software components are combined in accordance with one or more aspects of the present invention. Specifically, the present invention enables user-land software operation, regardless of physical link characteristics. The isochronous stream data may be received from either the Ethernet or IEEE 1394 link. Moreover, the existing applications and APIs running on the system cannot directly access the physical links; thus higher level software remains unaware of link specific operation.

The separation of user space from kernel space seamlessly provides isochronous data to the upper layer software without requiring configuration for either Ethernet AVB of FireWire protocols. Consequently, existing FireWire applications, like "iMovie", can run without requiring modification.

Figure 3D:
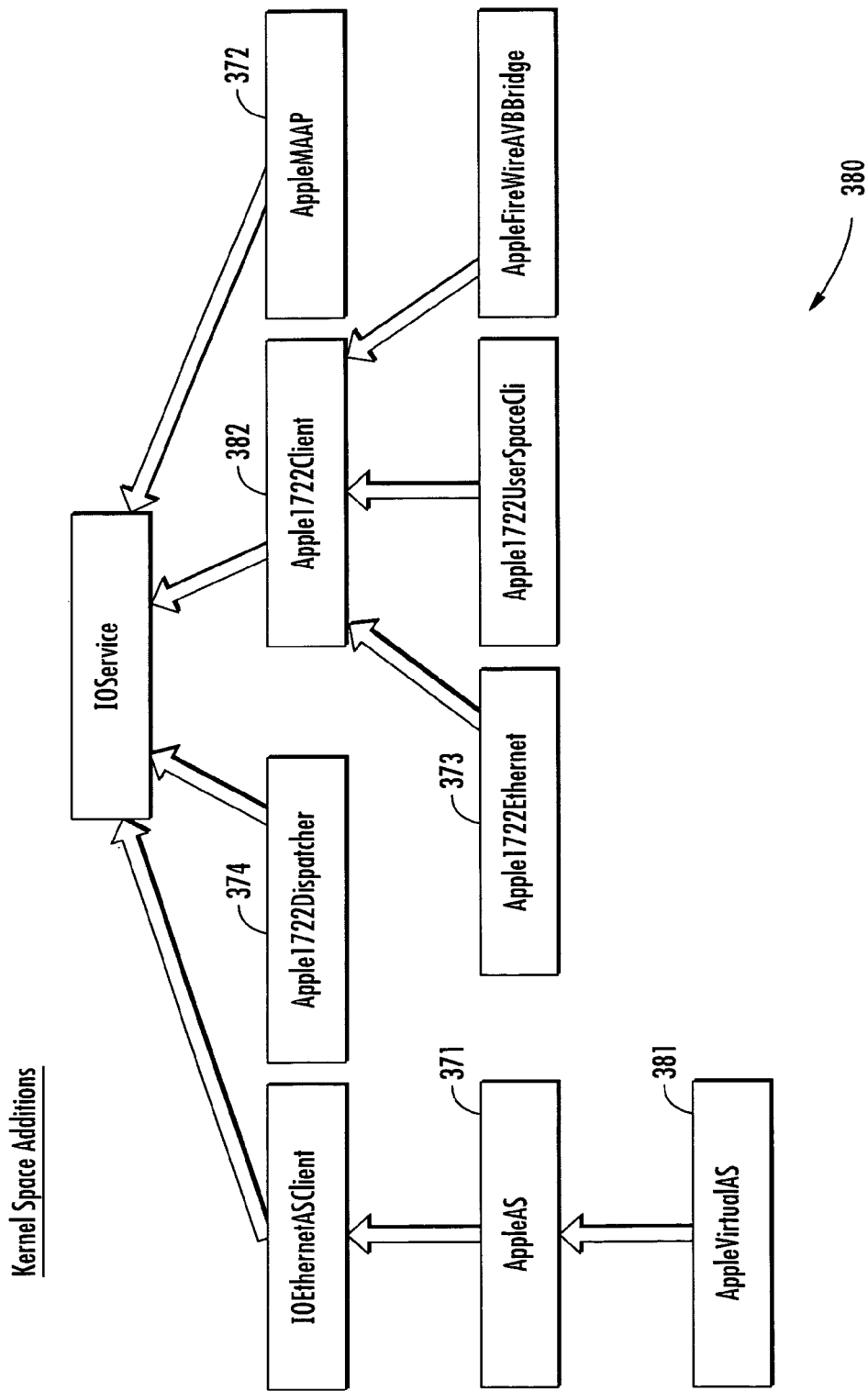
FIG. 3D is another graphical representation of various components of the protocol stack of FIG. 3C, and their inter-relationships.

FIG. 3D is another graphical representation 380 of various components of the example protocol stack of FIG. 3C, and their interrelationships. As shown in FIG. 3D, components added in the kernel space include: (i) AppleAVBInterface; (ii) AppleAS (802.1AS time synchronization) 371; (iii) AppleVirtualAS (802.1AS time synchronization for unsupported hardware) 381; (iv) AppleMAAP (dynamic allocation of multicast MAC addresses) 372; (v) Apple1722Dispatcher (routes AVB frames between multiple clients) 374; (vi) Apple1722Client (abstract client class) 382; (vii) Apple1722Ethernet (client subclass for Ethernet interface); and (viii) AppleFireWireAVBBridge.

Figure 3E:
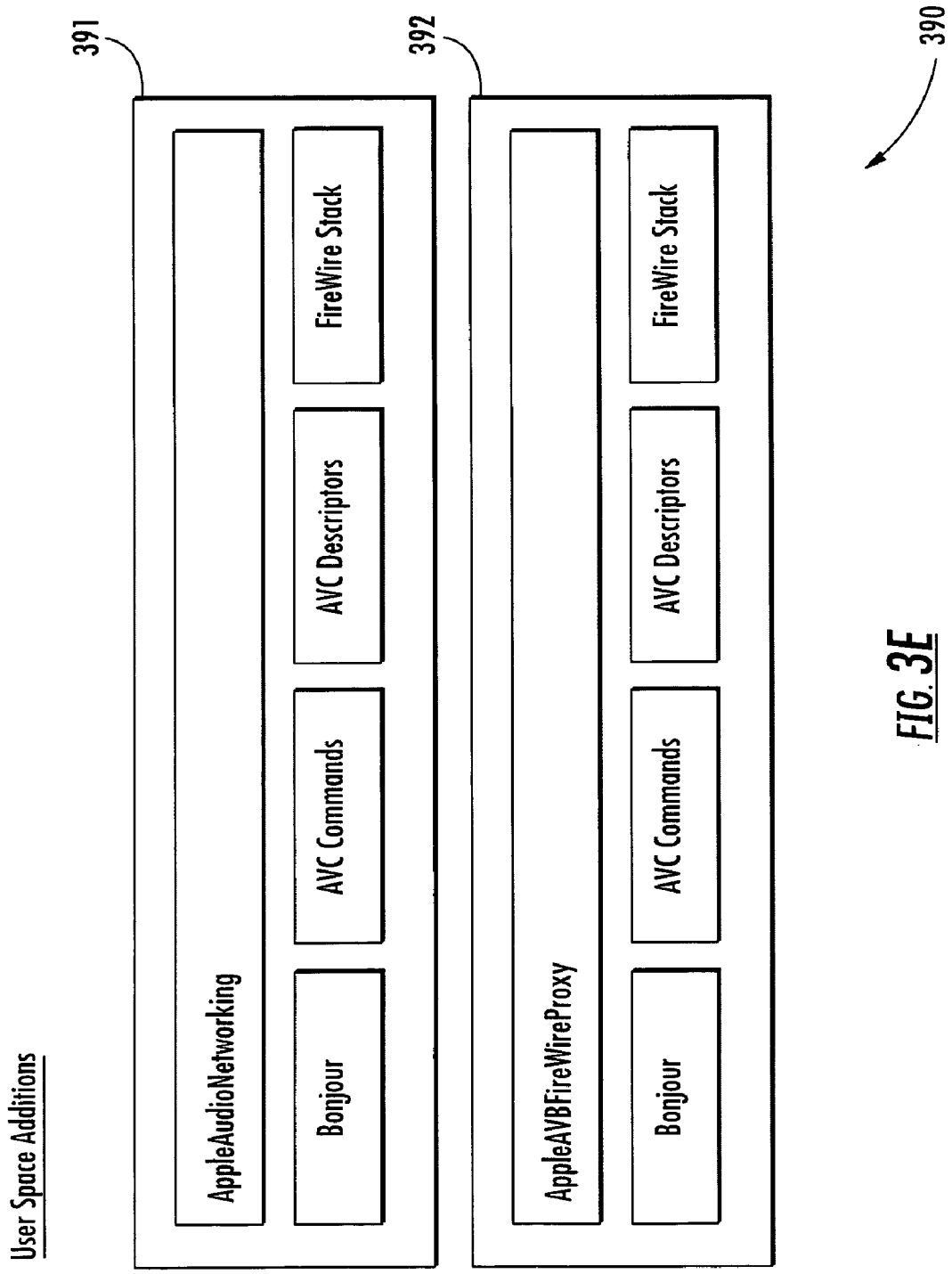
FIG. 3E is a graphical representation of one embodiment of user space additions useful for implementing the heterogeneous protocol data transfer functionality of the present invention.

FIG. 3E is a graphical representation 390 of one embodiment of an exemplary protocol stack (user space) implementing the heterogeneous protocol data transfer functionality of the present invention. The exemplary user space additions are two (2) peer entities: AppleAudioNetworking 391 and AppleAVBFireWireProxy 392. The AppleAudioNetworking software module is resident to the Ethernet AVB device, whereas the AppleAVBFireWireProxy software module communicates with the Firewire device. It should be noted that both modules may or may not be co-located within the same device, depending on implementation, etc.

Figure 3F:
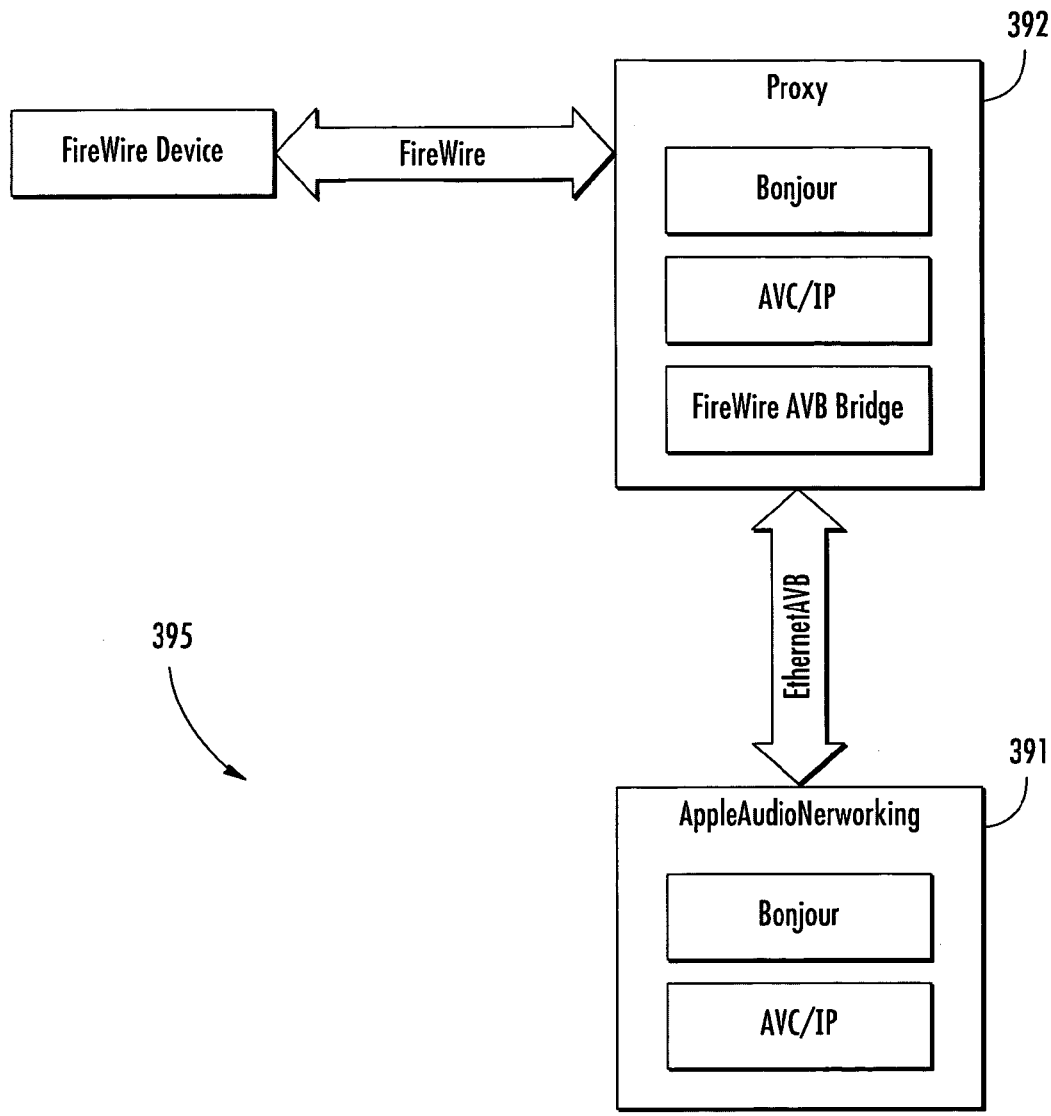
FIG. 3F is a block diagram of one exemplary embodiment of a software architecture employing a proxy for interfacing between a first device and various software processes on the same or different device, using the kernel space and user space components of FIGS. 3C and 3E, respectively.

FIG. 3F is a block diagram of one embodiment of a software architecture 395 employing a proxy for interfacing between a first device and various software processes on the same or different device. As shown in FIG. 3F, the kernel space and user space components of FIGS. 3C and 3E, respectively are used to bridge between a FireWire network, and an Ethernet AVB network, via the proxy software entity.

Figure 4:
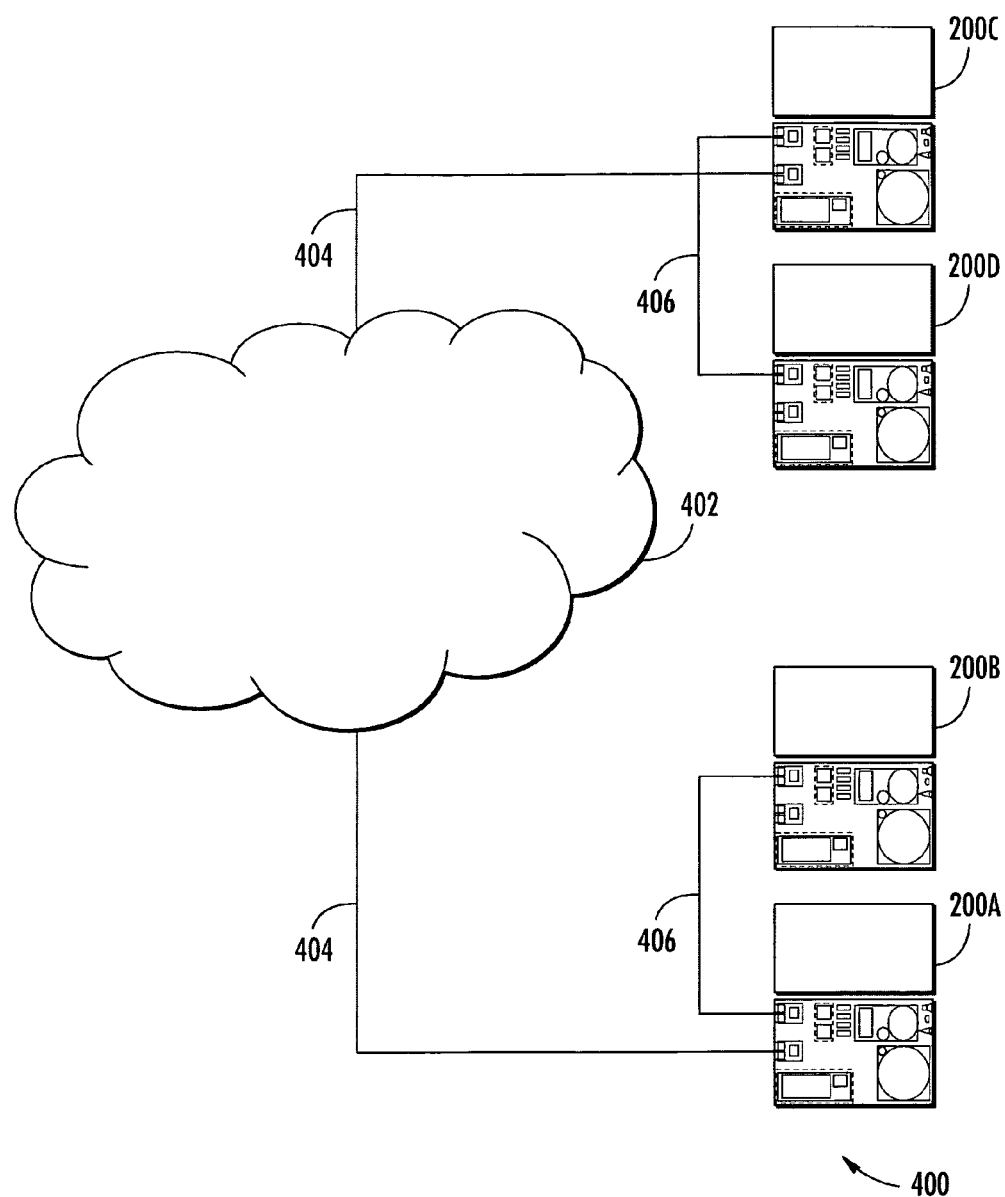
FIG. 4 is a block diagram illustrating one exemplary heterogeneous community of devices according to the invention.

Referring now to FIG. 4, one exemplary heterogeneous community 400 of the aforementioned devices useful in illustrating the methods and apparatus of the invention is described. As shown in FIG. 4, device 200A is physically interconnected to another device 200B via a common bus 406 (e.g. IEEE 1394), and logically interconnected via the aforementioned software functions. Each group of devices negotiates their internal addressing within a localized network. Bridging portals are devices which "bridge" from the localized network to an external device 200C (e.g., another device of similar or differing nature). Bridging portals provide connection 404 to a fabric 402, wherein the fabric must be capable of transferring any serial bus subaction from the bridging portal to its destination device (e.g. co-bridging portal, external device, etc.). The localized network may utilize a protocol (e.g., IEEE 1394.1), which is different than the interconnecting fabric (e.g. Ethernet AVB).

As previously described herein, the "fabric" of the present embodiment may be conceptualized as a set of FIFOs that support bidirectional, non-blocking transfer of asynchronous request subactions, asynchronous response subactions, and isochronous subactions. The fabric could be modest in geographical extent, as when the bridge portal and external device are located within a single enclosure. Conversely, the fabric could be physically extensive, as could be the case if a bridge's portal was located in separate room from the external device.

In one exemplary embodiment, the devices 200 are FireWire devices compliant with IEEE 1394, and the fabric 402 is an Ethernet AVB-compliant "cloud". As shown, an IEEE 1394.1 compatible portal 200A is on at least one side of the Ethernet AVB network, and employs AVC command interpreters in the portals to allow existing FireWire software to "see" FireWire and Ethernet AVB devices (i.e. 200C, 200D) that are not physically connected to the local FireWire bus via the Ethernet AVB connection 404.

In yet another exemplary embodiment, a pair of bridging portals (200A and 200C) may bridge two separate busses (406) having a first protocol, via a fabric (402) having a second different protocol with suitable isochronous properties. Such bridging portals are responsible for converting the information on one bus for transfer to the co-bridging portal on the other bus. The connection fabric between portals could be an internal bus, system bus, or any other interconnection readily understood by those skilled in the electronic arts. If the connection fabric between portals is private, the portals may send packets via the connection fabric without any additional processing (e.g. encryption). Certain interconnection fabrics are desirable for varying purposes; for instance, an Ethernet AVB network between bridging portals can enable significant geographic distance between a first and second network. If the fabric is an Ethernet AVB network, then the portals could be put anywhere on the Ethernet AVB cloud and still function correctly.

Example Use Scenarios—

In a first example, the Assignee manufactures and releases a new computer that has no FireWire ports but does include the new Ethernet AVB hardware. With a small dongle that implements the FireWire to AVB protocol conversion described in this patent, the user can connect the FireWire audio device to the dongle and then connect the dongle to the new computer via the Ethernet jack. The FireWireAVB proxy software on the computer will then connect to the FireWire audio device as if it is now an AVB audio device. The AppleEthernetAudio driver will enumerate and discover the device, presenting it to the Audio sub-system. Audio applications adapted to operate with FireWire type devices will operate seamlessly with the new computer. The bridging "dongle" will transparently enable the software to see the FireWire Audio device as if it was directly connected to a FireWire port.

In another aspect of this invention, a first computer can physically incorporate the "dongle" that is mentioned above to enable play through operation by a second computer on a computer network. The first computer with both FireWire and AVB compliant Ethernet hardware can act as a bridge between FireWire and Ethernet AVB. The software on the first computer would provide an "AVC FireWire device sharing mode" to the system software so that any computer (e.g. second computer) on the network could see the FireWire device attached to the first computer. A second computer on the network may then connect to the first computer over the Ethernet AVB network and use the services provided by the FireWire device. In this mode, an unmodified AVC FireWire application like iMovie running on the second computer, could operatively utilize the FireWire device resident to the first computer; iMovie could operate as if it was directly connected to the FireWire device.

The following example user scenarios (FIGS. 5A-D) illustrate some possible application environments enabled by the methods and apparatus of the present invention. These scenarios are only exemplary, and the invention is in no way limited thereto.

Figure 5A:
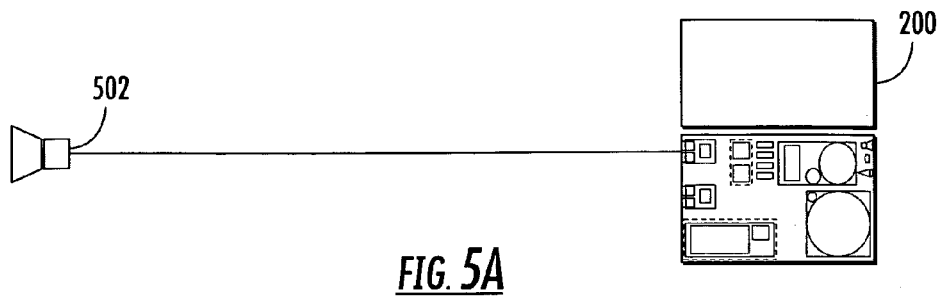
FIGS. 5A-5D are block diagrams illustrating various different user scenarios consistent with the present invention.

With respect to FIG. 5A, a regular user (Jack) is a Macintosh™ ("Mac") computer user and has been for many years. He owns a FireWire audio device (FAD) 502. He has been using the Mac OS X Leopard™ operating system for a long time, and has just upgraded to the latest Mac OS X, FatCat™.

Jack plugs in his FAD, starts Logic Pro, which is his digital audio workstation software (DAW) and sets it to use his FAD. He then proceeds to do what he has previously done with his DAW.

Mac OS X FatCat includes a new FireWire audio architecture supporting networking, and has added support for the new AVB specification; however Jack is not interested in any of these features and has never launched the AppleAudioNetworking application. None-the-less, he expects his FAD to behave exactly the same as it always has in previous versions of Mac OS X.

Figure 5B:
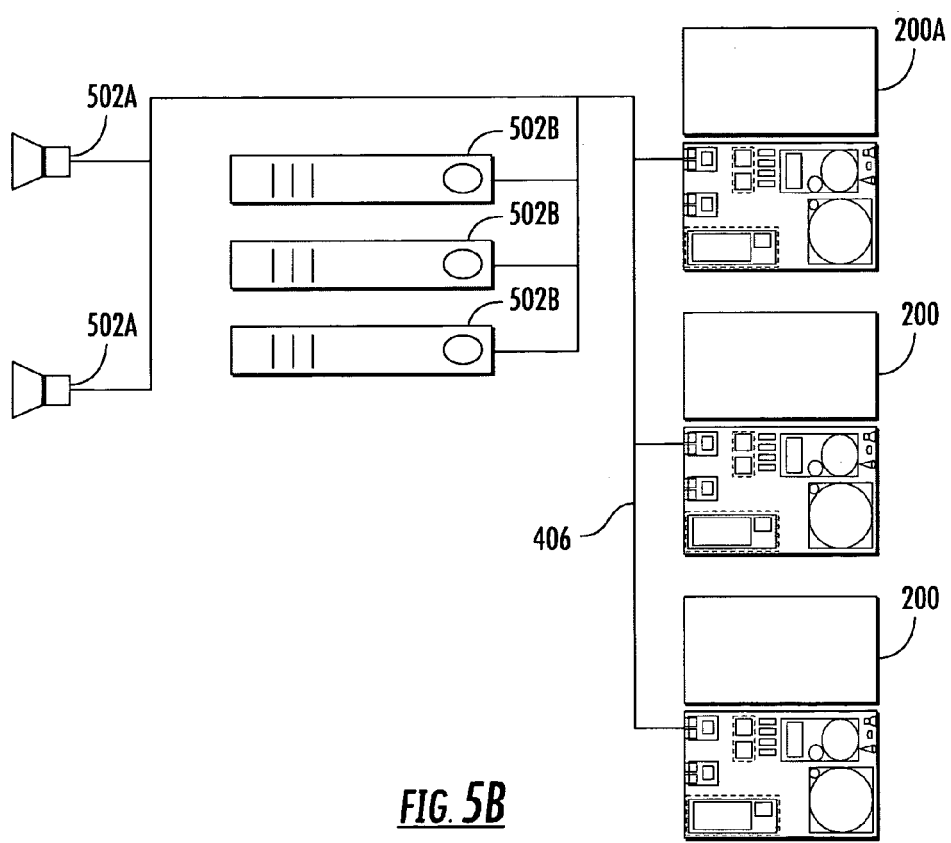

Referring now to FIG. 5B, a studio user (Bob) is a sound engineer at a recording studio. He uses Mac OS X as his platform of choice, and has many FADs around his studio. Bob has recently switched to the new Mac OS X FatCat because he has heard about the new FireWire audio networking feature.

Bob launches the AppleAudioNetworking application, and connects his all his FADs (which comprise two 2-channel FADs and 3 18-channel FADs) to his MacPro. He also connects several other Macintoshes to the FireWire bus to act as channel mappers. He configures his local Macintosh to have a 30 channel input, and output CoreAudio device consisting of three 10-channel input streams and one 42-channel output stream. He connects the 3 input streams to 3 of his 18 channel FADs. He creates a channel mapper on one of the remote machines that takes a 42-channel input stream, and outputs three 10-channel streams. He connects the input stream of the mapper to the output stream of his MacPro, and the 3 output streams to his 18-channel FADs. Bob also creates a channel mapper on another of his remote machines that takes a 42-channel input stream and outputs 6 2-channel streams. He connects the input stream of the mapper to the output stream of his MacPro, and the output streams to each of the 2-channel FADs. He adjusts the mapping so that the 2-channel FADs streams are connected to the last 12 channels rather than the first 12 channels. Bob then saves the configuration so that he can use it again.

Bob opens up the Logic (DAW) and configures it to use his new 30-channel input and 42-channel output device. He sets up appropriate mixes on the last 12 channels for the 2-channel FADs to be used as stage monitors, and sets up appropriate mixes on the first 30 channels. Bob then starts his recording session. When Bob has finished his recording session, and copied his audio, he turns off all of his equipment.

The next day Bob comes back to continue recording with the same setup. He turns on all of his equipment, starts his DAW and commences the day's activities.

Figure 5C:
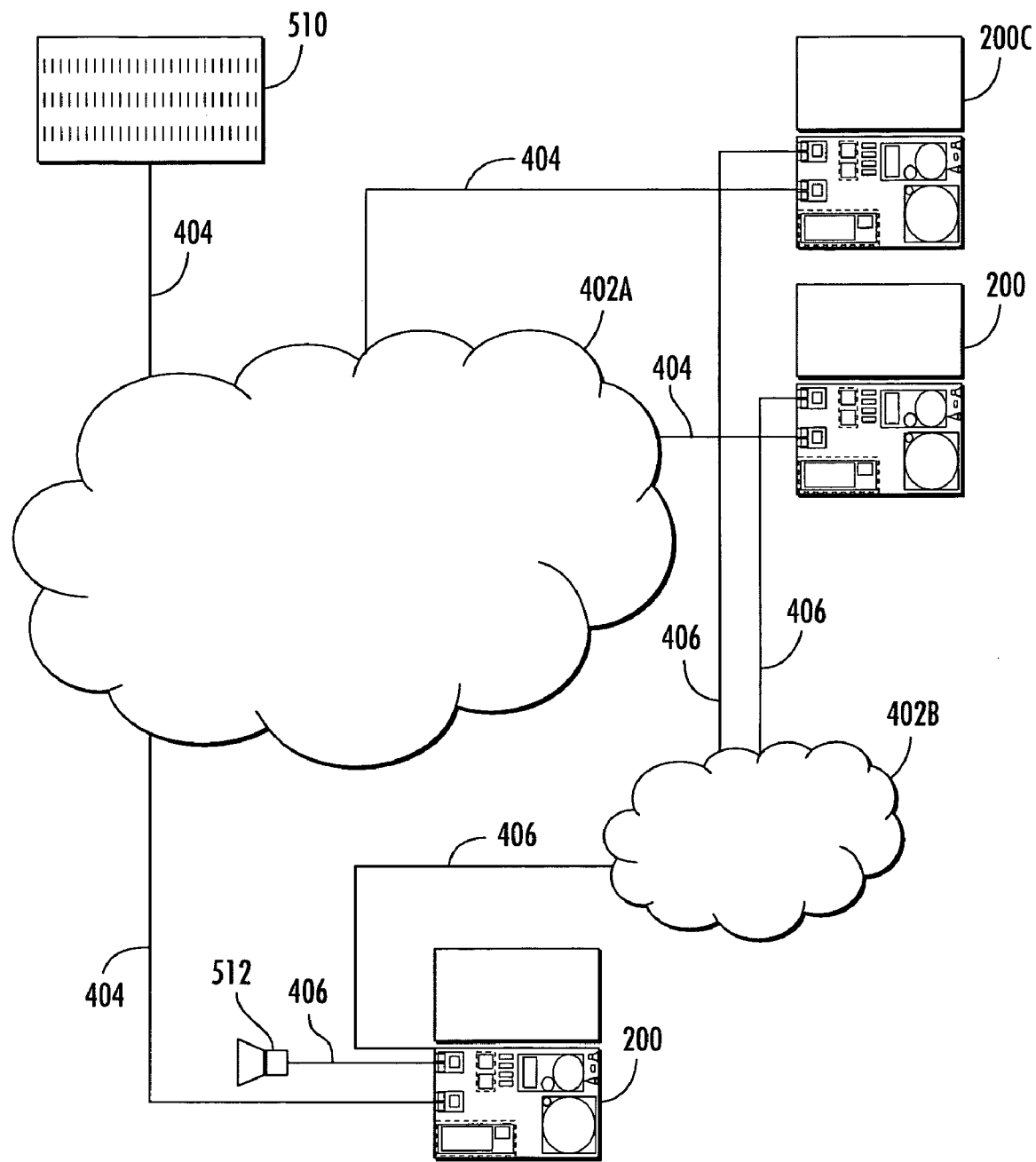

Referring to FIG. 5C, a live performance user (John) works at a concert hall. They have recently upgraded their system to use new high-speed Ethernet-based AVB and FireWire devices and Mac OS X FatCat as the control and configuration platform. The control room is equipped with several MacPro devices running various software applications needed to control their concert hall, and to run the AppleAudioNetworking software to configure their sound system.

The concert hall is fitted with AVB-equipped speakers rigs all being wired back to a central AVB cloud synchronized to a class-A specification. The MacPro devices in the control room, as well as several under the stage, are also connected to the live sound AVB cloud as well as a secondary communications cloud. A central AVB based mixing board 510 is provided in the control room, which can have configurations saved and loaded by a computer over the AVB cloud.

A new concert is being planned and setup in the hall. John's task is to set up the sound system. He sits down at the main configuration computer, opens AppleAudioNetworking, and loads a copy of the clean default sound network configuration. He adjusts the configuration for the particulars of the concert. One of the special features of this concert is a FireWire-based sound effects box which is triggered by the audio. This box is connected to one of the MacPro devices under the stage. The technicians on stage have already set this up, and so a new display icon has appeared in AppleAudioNetworking to represent this device. John needs to connect this to the mixing board.

While John was configuring the sound system routing, someone else was setting the mixing board configuration to add an extra stream for the sound effects box. They pass this file to John, who uploads it to the mixing board via a vendor plug-in in AppleAudioNetworking. John now has an extra output stream on the mixing board to connect to the special effects box. John connects the new output on the mixing board to the input of the special effects box, and AppleAudioNetworking establishes a connection between the two via a bridge on the MacPro to which the special effects box is connected. John then saves this configuration for the concert.

On the day of the concert, John loads up the saved configuration and then runs through the usual pre-concert checks.

Figure 5D:
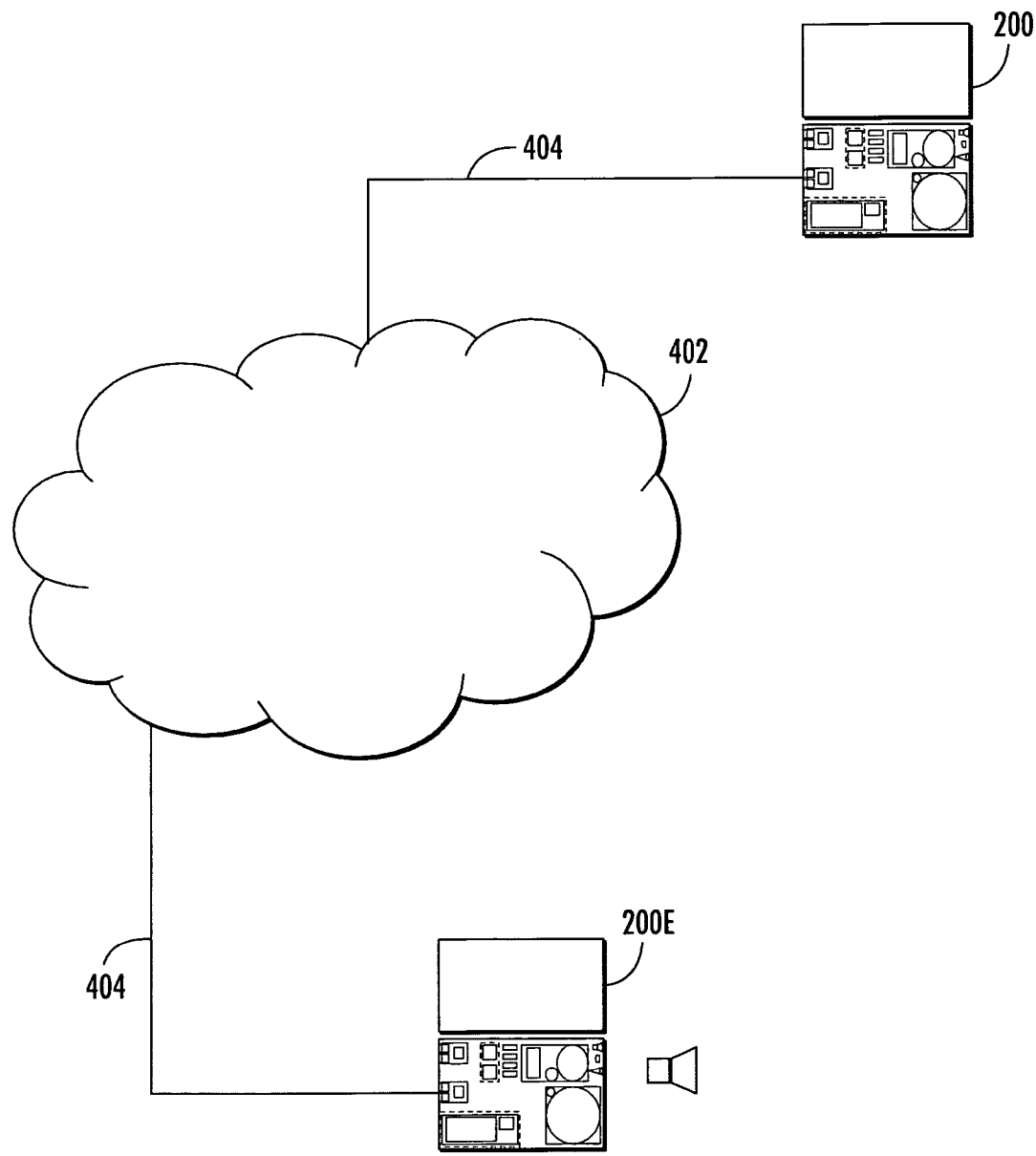

Referring to FIG. 5D, an experimenter (Eve) is an experienced Mac OS X user. She has just upgraded to Mac OS X FatCat. She has noticed a new feature of the operating system (audio networking). She has been exploring her system, and has discovered the AppleAudioNetworking application. She launches the application and is presented with the current configuration of her system. She has no FireWire or AVB devices, so all she sees is an icon for her local Mac. She opens the README link to find out more information about what she can do with the system/software.

She reads that she can set up multiple Macs on the same network to talk to each other, and send audio directly between the machines. Since she has two Macs running Mac OS X FatCat, she decides to set up an audio network to play with. She enables multi-Mac support on each of her machines, since it is a private network which nobody else can connect to, she decides to not enable password authentication.

On both Macs she creates a 2-channel AVB device. On one of her machines she connects the input of each machine to the output of the other machine. On one machine she opens up "System Preferences" and sets the AVB device as the output device. She then opens iTunes™ and starts playing her music. On the other machine, she enables pass-through from the AVB device to the built-in speakers, and her music begins playing from her speakers.

Wireless Variants

In another aspect of the invention, the aforementioned protocols used on the various communicating devices may comprise wireless protocols such as for example WLAN, PAN, or WAN/MAN protocols.

Wired operation may statically reserve resources to enable operation. For instance, Ethernet AVB requires each node between the source and targets to reserve resources for datastream transmission, thus providing a bandwidth, and latency guarantee. Transmission and reception of data is relatively reliable for wired devices; however, wireless devices may fade in and out of service, causing considerable complication. A wireless linkage in combination with a wired link may fade out unexpectedly, leaving unused reserved resources on the wired network. Methods and apparatus for bridging wireless/wired devices must also provide for "clean up" operations.

Under one embodiment, wireless operation of one or more components of the aforementioned heterogeneous networks is envisaged. In addition to providing a bridging access from a first wired protocol to a second wireless protocol, concurrent monitoring, diagnosis and re-routing of wireless/wired links are desired to minimize unnecessary resource utilization during a "fade out". In one variant, each of the bridging devices, the target or the source may transmit a link condition signal relating current status of the isochronous stream. A bridging element within a heterogeneous network may monitor the reliability of one or more wireless links, and transmit feedback to the source device, thus enabling the source device (and any associated wire line "hops") to throttle their reserved resources accordingly.

In another embodiment of the wireless/wired invention, a bridging element within a heterogeneous network may register a relative estimation of wireless robustness for use with the connection management software. In one variant, the connection management software may maintain an entry for each wireless device, related to relative wireless data rate. Such an entry may be e.g., a relative measurement of bit error rate (BER), signal to noise (SNR), or any of the other plethora of useful link-related measurements commonly known to those skilled in the telecommunications arts. In another variant, such an entry may additionally include a total number of subscribers actively connected to a datastream, to accommodate the requirements of broadcast and or multicast operation. For example, one or more subscribers may drop off without adversely affecting the experience of other broadcast subscribers.

In yet another embodiment of the wireless/partially wireless invention, a bridging element within a heterogeneous network having a wireless source and destination may continuously poll each wireless link for to modify its operation. In one variant, the bridging element may regularly insert, re-process or sniff packets being received and transmitted to dynamically size the reserved resources to only what the weakest link may serve. Alternatively, the bridging element may perform such monitoring to dynamically size the reserved resources to only what the strongest receiving link may serve (as applicable within a broadcast or multicast situation).

In yet another embodiment of the wireless/partially wireless invention, a bridging element within a heterogeneous network may receive link updates from one or more target device attached to a bus on the second protocol. For example, a bridging element connecting two differing wire line protocols may receive notification from one such protocol that a wireless linkage downstream has failed (e.g., a device on a wireless hub, which is connected to the bridging portal via wire line). Alternatively, a bridging element connecting a wireless protocol to a wired protocol may receive notification that a wireless link downstream of the wired protocol has failed (e.g. an Ethernet AVB cloud connecting a wireless device on a bridging node to a wireless LAN, etc.

A channel, mapping element may also be utilized consistent with the invention. Under one embodiment, the mapping element adaptively resizes channels based at least in part on the wireless channel reception. For example, one or more channels of channel mapping functionality may be preprocessed based at least in part on the expected wireless link quality.

Other implementations and variations of the foregoing features will be appreciated by those of ordinary skill given the present disclosure.

Business Methods and Models

In another aspect of the invention, various business models and methods of doing business relating the aforementioned heterogeneous networks are envisaged.

In one aspect, the ability to obviate one or more ports on a device is inherently less expensive. For example, a device manufacturer or service provider can support similar features to their preexisting products or services with a smaller bill of materials (BOM) for the correspondingly reduction in components (e.g. port connections, driver hardware, etc.). Furthermore, replacement of high cost port solutions (e.g. FireWire) with lower cost port solutions (e.g. Ethernet AVB) would also advantageously work to reduce manufacturing cost.

In another aspect, an adapter device capable of bridging between a first network, to a pre-existing device having a second network connection type could be manufactured and sold, so as to maintain backward compatibility. Consistent support of backward compatibility is generally considered in customer's determination of price; and customers will ostensibly be willing to pay more for consumer electronics devices which are supported through time, rather than made obsolete. Furthermore, the manufacture and sale of adapter devices (commonly referred to in the arts as a "dongle") is also profitable, in some cases providing opportunities for third party licensing fees.

In one embodiment, a device capable of both connection operation and streaming operation may require a software patch sold after purchase, to enable one, or both features. In a related embodiment, connection management is a relatively sporadic software function, whereas streaming data has specific requirements on the data path. These differences may be leveraged in manufacturing such specialized devices.

It will also be appreciated that the methods and apparatus described herein, by allowing for isochronous data networking spanning varying protocols and networks, and limited software modifications to extant infrastructure and devices, also provide an intrinsic cost benefit over prior art isochronous data networking technologies. Specifically, by obviating the expense of infrastructure through reuse of existing networking technology, some of the cost and complexity associated with such isochronous networking can be avoided, and customer systems made simpler and "thinner" in terms of capability.

Moreover, greater levels of connectivity between devices can be achieved, even when the pervasiveness of certain types of physical ports (e.g., 1394) has decreased with time.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I - OTHER STANDARDS AND TECHNOLOGIES

IEC 61883-1

IEC 61883-1 ("Consumer audio/video equipment - Digital interface - Part 1: General" - February 1998), incorporated by reference herein in its entirety, is a standard that describes, *inter alia*: (i) isochronous Plug Control Registers; (ii) Connection Management Protocol (CMP); (iii) Function Control Protocol (FCP); and (iv) Common Isochronous Packet (CIP) headers. It is useful for the transport of isochronous data when using AV/C, DVC, MPEG, or AMP.

AV/C General Specification

AV/C General Specification (Accepted by 1394 TA (version 4.2), and including 1998010 -"Enhancements to the AV/C General Specification 3.0", 1998001- "AV/C Digital Interface Command Set General Specification", and 1996002- "AV/C Digital Interface Command Set") each incorporated by reference herein in its entirety, defines *inter alia* general commands used to control consumer audio/video electronics. It utilizes 1394 Unit architectures, and is useful for implementation of audio/video devices, and for software driver development.

MPEG4 over 1394

MPEG4 over 1394 is not yet standardized; a study group is investigating the need/demand for a specification to transport MPEG4 (including H.264) over 1394, and identifying which parts of MPEG4 are applicable. The group is also discussing strategies for a specification (i.e., encapsulating in MPEG2-TS over 61883-4, or transport MPEG-4 in 'native' form over 1394). This standard (when finalized) would be applicable for all devices sending MPEG4 streams over 1394.

IEC 61883-6

IEC 61883-6 ("Consumer audio/video equipment - Digital interface - Part 6: Audio and music data transmission protocol" - February 1998), incorporated by reference herein in its entirety, is a standard that describes Audio/Music Transport Protocol across 1394. It is useful for devices transporting formatted Audio or Music streams over 1394.

IEC 61883-2

IEC 61833-2 ("Consumer audio/video equipment - Digital interface - Part 2: SD-DVCR data transmission" - February 1998), incorporated by reference herein in its entirety, is a standard that describes SD-DVCR Transport Protocol across 1394. It is useful for devices transporting SD-DVCR over 1394.

IEC 61833-3

IEC 61883-3 ("Consumer audio/video equipment - Digital interface - Part 3: HD-DVCR data transmission" - February 1998), incorporated by reference herein in its entirety, is a standard that describes an HD-DVCR Transport Protocol across 1394.

IEC 61883-5

IEC 61883-5 ("Consumer audio/video equipment - Digital interface - Part 5: SDL-DVCR data transmission (TA4)" - February 1998), incorporated by reference herein in its entirety, is a standard that describes SDL-DVCR Transport Protocol across 1394.

IEC 61883-4

IEC 61883-4 ("Consumer audio/video equipment - Digital interface - Part 4: MPEG2-TS data transmission" - February 1998), incorporated by reference herein in its entirety, is a standard that describes MPEG Transport Streams (TS) (including DVB TS) across 1394.

IEC 61883-7

IEC 61883-7 ("Consumer audio/video equipment - Digital interface - Part 7: Transmission of ITU-R BO.1294 System B" - February 1998), incorporated by reference herein in its entirety, is a standard that describes MPEG Transport Streams (TS) for DSS (not quite the same as standard MPEG-2) across 1394.

TA 1998005

TA 1998005 ("AV/C Tuner Broadcast System Specification - Digital Video Broadcast (DVB) – 1998), incorporated by reference herein in its entirety, is a standard that describes AV/C control enhancements for Digital Video Broadcast (DVB) video tuners. It is useful for devices doing DVB video tuning controlled across 1394.

APPENDIX II

```
/*
 *   AppleAS.cpp
 *   AppleAVBInterface
 *
 *
 */

///////////////////////////////////////////////////////
// AppleAVBInterface::start
///////////////////////////////////////////////////////
bool AppleAS::start( IOService * provider )
{
      bool result = true;
      bool startDone = false;
      IOReturn status;

FunctionEntryLog("%p", provider)

result = super::start(provider);

FailIf(true != result,  Exit);

startDone = true;

fProvider = OSDynamicCast(IOEthernetInterface,
provider);

fWorkLoop = fProvider->getWorkLoop();

if(!fWorkLoop)
      {
            DebugLog("   could not get work loop\n");
            result = false;
            goto Exit;
      } fSyncFollowUpTimeout =
IOTimerEventSource::timerEventSource(this,
(IOTimerEventSource::Action)&followUpTimeout);
         if(!fSyncFollowUpTimeout)
         {
            DebugLog("   could not create Sync FollowUp timeout
timer\n");
```

```
        result = false;
        goto Exit;
} status = fWorkLoop-
>addEventSource(fSyncFollowUpTimeout);
    if(kIOReturnSuccess != status)
    {
        DebugLog("  could not added Sync FollowUp timeout
timer to workloop\n");
        result = false;
        goto Exit;
    } fPDelayTimeout =
IOTimerEventSource::timerEventSource(this,
(IOTimerEventSource::Action)&pDelayTimeout);
    if(!fPDelayTimeout)
    {
        DebugLog("  could not create PDelay timeout
timer\n");
        result = false;
        goto Exit;
    } status = fWorkLoop->addEventSource(fPDelayTimeout);
    if(kIOReturnSuccess != status)
    {
        DebugLog("  could not added PDelay timeout timer
to workloop\n");
        result = false;
        goto Exit;
    } fLLDPTimer = IOTimerEventSource::timerEventSource(this,
(IOTimerEventSource::Action)&lldpTimeout);
    if(!fLLDPTimer)
    {
        DebugLog("  could not create LLDP timer\n");
        result = false;
        goto Exit;
    } status = fWorkLoop->addEventSource(fLLDPTimer);
    if(kIOReturnSuccess != status)
    {
```

```
            DebugLog("   could not added LLDP timer to
workloop\n");
            result = false;
            goto Exit;
    } fAnnounceTimer =
IOTimerEventSource::timerEventSource(this,
(IOTimerEventSource::Action)&announceTimer);
    if(!fAnnounceTimer)
    {
            DebugLog("   could not create announce timer\n");
            result = false;
            goto Exit;
    } status = fWorkLoop->addEventSource(fAnnounceTimer);
    if(kIOReturnSuccess != status)
    {
            DebugLog("   could not add announce timer to
workloop\n");
            result = false;
            goto Exit;
    } fSyncFollowupTimer =
IOTimerEventSource::timerEventSource(this,
(IOTimerEventSource::Action)&syncTimer);
    if(!fSyncFollowupTimer)
    {
            DebugLog("   could not create Sync FollowUp timeout
timer\n");
            result = false;
            goto Exit;
    } status = fWorkLoop->addEventSource(fSyncFollowupTimer);
    if(kIOReturnSuccess != status)
    {
            DebugLog("   could not added Sync FollowUp timeout
timer to workloop\n");
            result = false;
            goto Exit;
    } portSyncStateChanged(PSInitialize);
```

```
    OSString *bsdName = OSDynamicCast(OSString, fProvider-
>getProperty("BSD Name"));
    DebugLog("  Found ethernet port \"%s\"\n", bsdName-
>getCStringNoCopy());

strncpy(fIFName, bsdName->getCStringNoCopy(),
kMaxIFNameLength);

openNetworkInterface();

FailIf(!fNetworkInterface, Exit);

ifnet_lladdr_copy_bytes(fNetworkInterface, fSourceMAC,
kIOEthernetAddressSize);

DebugLog("  source ");
    debugLogMac(fSourceMAC);
    DebugLog("\n");

MACToEUI64(fSourceMAC, fEUI64);

fPortNumber = fProvider->getUnitNumber();

DebugLog("  UnitNumber: %u\n", fPortNumber);

DebugLog("  Triggers\n");
    DebugLog("    PSInitialize %d\n", PSInitialize);
    DebugLog("    PSInitializationComplete %d\n",
PSInitializationComplete);
    DebugLog("    PSFaultDetected %d\n", PSFaultDetected);
    DebugLog("    PSFaultCleared %d\n", PSFaultCleared);
    DebugLog("    PSDesignatedEnabled %d\n",
PSDesignatedEnabled);
    DebugLog("    PSDesignatedDisabled %d\n",
PSDesignatedDisabled);
    DebugLog("    PSPowerUp %d\n", PSPowerUp);
    DebugLog("    \n");
    DebugLog("    PSFallthrough %d\n", PSFallthrough);
    DebugLog("    PSTimeout %d\n", PSTimeout);
    DebugLog("    \n");
    DebugLog("    PSTSReceivedTSSyncIndication %d\n",
PSTSReceivedTSSyncIndication);
    DebugLog("    PSSSReceivedPSSyncRequest %d\n",
PSSSReceivedPSSyncRequest);
    DebugLog("    PSSSReceivedTSSyncConfirm %d\n",
```

```
PSSSReceivedTSSyncConfirm);
    DebugLog("   PSSSTSFollowUpSuccess %d\n",
PSSSTSFollowUpSuccess);
    DebugLog("   \n");
    DebugLog("   PSTSReceivedTSAnnounceIndication %d\n",
PSTSReceivedTSAnnounceIndication);
    DebugLog("   PSSSPSReceivedAnnounceRequest %d\n",
PSSSPSReceivedAnnounceRequest);
    DebugLog("   \n");
    DebugLog("   PSTSSFUSyncReceived %d\n",
PSTSSFUSyncReceived);
    DebugLog("   PSTSSFUFollowUpReceived %d\n",
PSTSSFUFollowUpReceived);
    DebugLog("   \n");
    DebugLog("   PSTSPDRSendRequest %d\n",
PSTSPDRSendRequest);
    DebugLog("   PSTSPDRResponseReceived %d\n",
PSTSPDRResponseReceived);
    DebugLog("   PSTSPDRResponseFollowUpReceived %d\n",
PSTSPDRResponseFollowUpReceived);

fPortSyncState = PSUninitialized;
    fPortSyncTSTimeSyncState =
PSTSTSWaitingForInitialization;
    fPortSyncSiteSyncTimeSyncState =
PSSSTSWaitingForInitialization;
    fPortSyncTSMasterSelectionState =
PSMSWaitingForInitialization;
    fPortSyncSiteSyncMasterSelectionState =
PSMSWaitingForInitialization;
    fTSSyncFollowUpState = TSSFUWaitingForInitialization;
    fTSPDelayRequestState = TSPDRWaitingForInitialization;

setEtherFrameHeader(&(fLLDPFrame.etherHeader),
asReservedMulticastAddress, k8021ABEtherType);

fLLDPFrame.chassisHeader.type = 1;
    fLLDPFrame.chassisHeader.length = 8;
    *(UInt16 *)&(fLLDPFrame.chassisHeader) =
OSSwapHostToBigInt16(*(UInt16
*)&(fLLDPFrame.chassisHeader));
    fLLDPFrame.chassisSubtype = 0x07;
    memcpy(fLLDPFrame.chassisID, "APPLE", 5);

fLLDPFrame.portIDHeader.type = 2;
    fLLDPFrame.portIDHeader.length = 8;
```

```
      *(UInt16 *)&(fLLDPFrame.portIDHeader) =
OSSwapHostToBigInt16(*(UInt16 *)&(fLLDPFrame.portIDHeader));
      fLLDPFrame.portIDSubtype = 0x07;
      memcpy(fLLDPFrame.portID, fIFName, 3);

fLLDPFrame.timeToLiveHeader.type = 3;
      fLLDPFrame.timeToLiveHeader.length = 2;
      *(UInt16 *)&(fLLDPFrame.timeToLiveHeader) =
OSSwapHostToBigInt16(*(UInt16
*)&(fLLDPFrame.timeToLiveHeader));
      fLLDPFrame.timeToLive = OSSwapHostToBigInt16(256);

fLLDPFrame.systemCapabilitiesHeader.type = 7;
      fLLDPFrame.systemCapabilitiesHeader.length = 4;
      *(UInt16 *)&(fLLDPFrame.systemCapabilitiesHeader) =
OSSwapHostToBigInt16(*(UInt16
*)&(fLLDPFrame.systemCapabilitiesHeader));
      fLLDPFrame.systemCapabilities =
OSSwapHostToBigInt16(0x0004);
      fLLDPFrame.enabledCapabilities =
OSSwapHostToBigInt16(0x0004);

#if k8021ABUseXXXXXXXOrgSpecific
      fLLDPFrame.orgSpecificHeader.type = 127;
      fLLDPFrame.orgSpecificHeader.length = 8;
      *(UInt16 *)&(fLLDPFrame.orgSpecificHeader) =
OSSwapHostToBigInt16(*(UInt16
*)&(fLLDPFrame.orgSpecificHeader));
      fLLDPFrame.orgSpecific =
OSSwapHostToBigInt64(0x0080c20403415642llu);
endif fLLDPFrame.endHeader.type = 0;
      fLLDPFrame.endHeader.length = 0;

portSyncStateChanged(PSInitializationComplete);

fAnnounceTimer-
>setTimeoutUS(k8021ASMeanIntervalUS(k8021ASAnnounceInterval)
);
      fSyncFollowupTimer-
>setTimeoutUS(k8021ASMeanIntervalUS(k8021ASSyncInterval));

Exit:
      if(!result)
      {
```

```
if(fSyncFollowUpTimeout)
{
        fSyncFollowUpTimeout->cancelTimeout();
        if(fWorkLoop)
        {
                fWorkLoop-
>removeEventSource(fSyncFollowUpTimeout);
        }
        fSyncFollowUpTimeout->release();
        fSyncFollowUpTimeout = NULL;
} if(fPDelayTimeout)
{
        fPDelayTimeout->cancelTimeout();
        if(fWorkLoop)
        {
                fWorkLoop-
>removeEventSource(fPDelayTimeout);
        }
        fPDelayTimeout->release();
        fPDelayTimeout = NULL;
} if(fLLDPTimer)
{
        fLLDPTimer->cancelTimeout();
        if(fWorkLoop)
        {
                fWorkLoop-
>removeEventSource(fLLDPTimer);
        }
        fLLDPTimer->release();
        fLLDPTimer = NULL;
} if(fAnnounceTimer)
{
        fAnnounceTimer->cancelTimeout();
        if(fWorkLoop)
        {
                fWorkLoop-
>removeEventSource(fAnnounceTimer);
        }
        fAnnounceTimer->release();
        fAnnounceTimer = NULL;
```

```
        } if(fSyncFollowupTimer)
        {
                fSyncFollowupTimer->cancelTimeout();
                if(fWorkLoop)
                {
                        fWorkLoop->removeEventSource(fSyncFollowupTimer);
                }
                fSyncFollowupTimer->release();
                fSyncFollowupTimer = NULL;
        } if(startDone)
        {
                super::stop(provider);
        }
    }

FunctionBoolExitLog(result)

return result;
} void AppleAS::stop( IOService * provider )
{
    FunctionEntryLog("%p", provider)

closeNetworkInterface();

if(fSyncFollowUpTimeout)
    {
        fSyncFollowUpTimeout->cancelTimeout();
        if(fWorkLoop)
        {
                fWorkLoop->removeEventSource(fSyncFollowUpTimeout);
        }
        fSyncFollowUpTimeout->release();
        fSyncFollowUpTimeout = NULL;
    } if(fPDelayTimeout)
    {
        fPDelayTimeout->cancelTimeout();
```

```
        if(fWorkLoop)
        {
                fWorkLoop->removeEventSource(fPDelayTimeout);
        }
        fPDelayTimeout->release();
        fPDelayTimeout = NULL;
    } if(fLLDPTimer)
    {
        fLLDPTimer->cancelTimeout();
        if(fWorkLoop)
        {
                fWorkLoop->removeEventSource(fLLDPTimer);
        }
        fLLDPTimer->release();
        fLLDPTimer = NULL;
    } if(fAnnounceTimer)
    {
        fAnnounceTimer->cancelTimeout();
        if(fWorkLoop)
        {
                fWorkLoop->removeEventSource(fAnnounceTimer);
        }
        fAnnounceTimer->release();
        fAnnounceTimer = NULL;
    } if(fSyncFollowupTimer)
    {
        fSyncFollowupTimer->cancelTimeout();
        if(fWorkLoop)
        {
                fWorkLoop-
>removeEventSource(fSyncFollowupTimer);
        }
        fSyncFollowupTimer->release();
        fSyncFollowupTimer = NULL;
    } super::stop(provider);
    FunctionExitLog
}
```

```
void debugLogMac(UInt8 *mac)
{
     DebugLog("MAC Address: %02x:%02x:%02x:%02x:%02x:%02x",
mac[0], mac[1], mac[2], mac[3], mac[4], mac[5]);
}

IOService *AppleAS::probe( IOService *provider, SInt32
*score )
{
     IOService *result = NULL;
     IONetworkInterface *networkInterface = NULL;

FunctionEntryLog("%p, %p(%d)", provider, score, *score)

result = super::probe(provider, score);
     FailIf(!result, Exit);

result = NULL; //Super worked so lets reset to NULL
here.

networkInterface = OSDynamicCast ( IONetworkInterface,
provider );
     FailIf(!networkInterface, Exit);

if ( networkInterface->isRegistered () )
     {
          IONetworkController *networkController = NULL;
          IONetworkMedium *networkMedium = NULL;

networkController = networkInterface-
>getController();
          FailIf(!networkController, Exit);

networkMedium = (IONetworkMedium *)
networkController->getSelectedMedium();
          FailIf(!networkMedium, Exit);

if ( kIOMediumEthernet == networkMedium->getType()
) // Only 802.3 Ethernet interfaces.
          {
               OSString *bsdName = OSDynamicCast(OSString,
networkInterface->getProperty("BSD Name"));
               DebugLog("  Found ethernet port \"%s\"\n",
bsdName->getCStringNoCopy());

bool interfaceIsSafe = true;
```

```
#if SAFE_INTERFACE_ONLY
            OSBoolean *builtin = OSDynamicCast(OSBoolean,
networkInterface->getProperty("IOBuiltin"));
            if(builtin)
            {
                interfaceIsSafe = !builtin->getValue();
            }
            else
            {
                interfaceIsSafe = false;
            }
#else if NO_EN0
            if(bsdName->isEqualTo("en0"))
            {
                interfaceIsSafe = false;
            }
endif if(interfaceIsSafe)
            {
                result = this;
            }
        }
    }

Exit:
    FunctionExitLog
    return result;
} pragma mark - pragma mark State Machines pragma mark 802.1AS 10.6.2 State machine for iniialization
and generic detection of faults
void AppleAS::portSyncStateChanged(PortSyncStateTrigger
trigger)
{
    FunctionEntryLog("%d", trigger)

switch(fPortSyncState)
    {
        case PSUninitialized:
            switch(trigger)
            {
```

```
                case PSInitialize:
                    fPortSyncState = PSInitializing;
                    break;

default:
                    DebugLog(" Invalid trigger for
PSUninitialized state, %d\n", trigger);
            }
            break;
        case PSInitializing:
            switch(trigger)
            {
                case PSInitializationComplete:
                    fPortSyncState = PSActive;
                    break;

default:
                    DebugLog(" Invalid trigger for
PSInitializing state, %d\n", trigger);
            }
            break;
        case PSActive:
            switch(trigger)
            {
                case PSInitialize:
                    fPortSyncState = PSInitializing;
                    break;
                case PSFaultDetected:
                    fPortSyncState = PSFaulty;
                    break;
                case PSDesignatedDisabled:
                    fPortSyncState = PSDisabled;
                    break;

default:
                    DebugLog(" Invalid trigger for
PSActive state, %d\n", trigger);
            }
            break;
        case PSFaulty:
            switch(trigger)
            {
                case PSInitialize:
                    fPortSyncState = PSInitializing;
                    break;
                case PSFaultDetected:
```

```
                        fPortSyncState = PSFaulty;
                        break;
                case PSFaultCleared:
                        fPortSyncState = PSInitializing;
                        break;
                case PSDesignatedDisabled:
                        fPortSyncState = PSDisabled;
                        break;

default:
                        DebugLog("   Invalid trigger for
PSFaulty state, %d\n", trigger);
                }
                break;
        case PSDisabled:
                switch(trigger)
                {
                        case PSInitialize:
                                fPortSyncState = PSInitializing;
                                break;
                        case PSDesignatedEnabled:
                                fPortSyncState = PSInitializing;
                                break;

default:
                                DebugLog("   Invalid trigger for
PSDisabled state, %d\n", trigger);
                }
                break;
        } updatePortSyncStateVariables();

FunctionExitLog
} void AppleAS::updatePortSyncStateVariables( void )
{
        FunctionEntryLog("")

switch(fPortSyncState)
        {
                case PSInitializing:
                        //Put FSM's into waiting for initialization
state
                        portSyncTSTimeSyncStateChanged(PSInitialize);
```

```
            portSyncSiteSyncTimeSyncStateChanged(PSInitialize);

portSyncTSMasterSelectionStateChanged(PSInitialize);

portSyncSiteSyncMasterSelectionStateChanged(PSInitializ
e);
                break;
            case PSActive:
                //Put FSM's into Active state portSyncTSTimeSyncStateChanged(PSInitializationComplete
);

portSyncSiteSyncTimeSyncStateChanged(PSInitializationCo
mplete);

portSyncTSMasterSelectionStateChanged(PSInitializationC
omplete);

portSyncSiteSyncMasterSelectionStateChanged(PSInitializ
ationComplete);

tsSyncFollowUpStateChanged(PSInitializationComplete);

tsPDelayRequestStateChanged(PSInitializationComplete);
                fLLDPTimer-
>setTimeoutMS(k8021ABTimeoutPeriod);
                break;
            case PSFaulty:
                //Put FSM's into waiting for initialization
state portSyncTSTimeSyncStateChanged(PSFaultDetected);

portSyncSiteSyncTimeSyncStateChanged(PSFaultDetected);

portSyncTSMasterSelectionStateChanged(PSFaultDetected);

portSyncSiteSyncMasterSelectionStateChanged(PSFaultDete
cted);
                tsSyncFollowUpStateChanged(PSFaultDetected);
                tsPDelayRequestStateChanged(PSFaultDetected);
                fLLDPTimer->cancelTimeout();
                break;
            case PSDisabled:
```

```
                    //Put FSM's into waiting for initialization
state portSyncTSTimeSyncStateChanged(PSDesignatedDisabled);

portSyncSiteSyncTimeSyncStateChanged(PSDesignatedDisabl
ed);

portSyncTSMasterSelectionStateChanged(PSDesignatedDisab
led);

portSyncSiteSyncMasterSelectionStateChanged(PSDesignate
dDisabled);

tsSyncFollowUpStateChanged(PSDesignatedDisabled);

tsPDelayRequestStateChanged(PSDesignatedDisabled);
            fLLDPTimer->cancelTimeout();
            break;
    }

FunctionExitLog
} pragma mark 802.1AS X.X.X State machine for
void AppleAS::portSyncTSTimeSyncStateChanged(
PortSyncStateTrigger trigger )
{
    FunctionEntryLog("%d", trigger)

switch(fPortSyncTSTimeSyncState)
    {
        case PSTSTSWaitingForInitialization:
            switch(trigger)
            {
                case PSInitializationComplete:
                    fPortSyncTSTimeSyncState =
PSTSTSActive;
                    break;
                case PSInitialize:
                case PSFaultDetected:
                case PSDesignatedDisabled:
                    fPortSyncTSTimeSyncState =
PSTSTSWaitingForInitialization;
                    break;
```

```
                default:
                        DebugLog("  Invalid trigger for
PSTSTSWaitingForInitialization state, %d\n", trigger);
                }
                break;
        case PSTSTSActive:
                switch(trigger)
                {
                        case PSTSReceivedTSSyncIndication:
                                fPortSyncTSTimeSyncState =
PSTSTSReceivedSync;
                                break;
                        case PSInitialize:
                        case PSFaultDetected:
                        case PSDesignatedDisabled:
                                fPortSyncTSTimeSyncState =
PSTSTSWaitingForInitialization;
                                break;

default:
                                DebugLog("  Invalid trigger for
PSTSTSActive state, %d\n", trigger);
                }
                break;
        case PSTSTSReceivedSync:
                switch(trigger)
                {
                        case PSTSReceivedTSSyncIndication:
                                fPortSyncTSTimeSyncState =
PSTSTSActive;
                                break;
                        case PSInitialize:
                        case PSFaultDetected:
                        case PSDesignatedDisabled:
                                fPortSyncTSTimeSyncState =
PSTSTSWaitingForInitialization;
                                break;

default:
                                DebugLog("  Invalid trigger for
PSTSTSReceivedSync state, %d\n", trigger);
                }
                break;
    } updatePortSyncTSTimeSyncStateVariables();
```

```
        FunctionExitLog
} void AppleAS::updatePortSyncTSTimeSyncStateVariables( void )
{
        FunctionEntryLog("")

switch(fPortSyncTSTimeSyncState)
        {
                case PSTSTSWaitingForInitialization:
                case PSTSTSActive:
                case PSTSTSReceivedSync:
                        break;
        }

FunctionExitLog
} pragma mark 802.1AS X.X.X State machine for
void AppleAS::portSyncSiteSyncTimeSyncStateChanged(
PortSyncStateTrigger trigger )
{
        FunctionEntryLog("%d", trigger)

switch(fPortSyncSiteSyncTimeSyncState)
        {
                case PSSSTSWaitingForInitialization:
                        switch(trigger)
                        {
                                case PSInitializationComplete:
                                        fPortSyncSiteSyncTimeSyncState =
PSSSTSActive;
                                        break;
                                case PSInitialize:
                                case PSFaultDetected:
                                case PSDesignatedDisabled:
                                        fPortSyncSiteSyncTimeSyncState =
PSSSTSWaitingForInitialization;
                                        break;

default:
                                        DebugLog("  Invalid trigger for
PSSSTSWaitingForInitialization state, %d\n", trigger);
                        }
                        break;
```

```
                case PSSSTSActive:
                    switch(trigger)
                    {
                        case PSSSReceivedPSSyncRequest:
                            fPortSyncSiteSyncTimeSyncState =
PSSSTSSendTSSyncRequest;
                            break;
                        case PSInitialize:
                        case PSFaultDetected:
                        case PSDesignatedDisabled:
                            fPortSyncSiteSyncTimeSyncState =
PSSSTSWaitingForInitialization;
                            break;

default:
                            DebugLog(" Invalid trigger for
PSSSTSActive state, %d\n", trigger);
                    }
                    break;
                case PSSSTSSendTSSyncRequest:
                    switch(trigger)
                    {
                        case PSSSReceivedTSSyncConfirm:
                            fPortSyncSiteSyncTimeSyncState =
PSSSTSSendTSFollowUpRequest;
                            break;
                        case PSInitialize:
                        case PSFaultDetected:
                        case PSDesignatedDisabled:
                            fPortSyncSiteSyncTimeSyncState =
PSSSTSWaitingForInitialization;
                            break;

default:
                            DebugLog(" Invalid trigger for
PSSSTSSendTSSyncReq state, %d\n", trigger);
                    }
                    break;
                case PSSSTSSendTSFollowUpRequest:
                    switch(trigger)
                    {
                        case PSSSTSFollowUpSuccess:
                            fPortSyncSiteSyncTimeSyncState =
PSSSTSSendTSSyncRequest;
                            break;
                        case PSInitialize:
```

```
                    case PSFaultDetected:
                    case PSDesignatedDisabled:
                            fPortSyncSiteSyncTimeSyncState =
PSSSTSWaitingForInitialization;
                            break;

default:
                            DebugLog(" Invalid trigger for
PSSSTSSendTSFollowUpReq state, %d\n", trigger);
                    }
                    break;
            case PSSSTSSyncReceiptTimeout:
                    switch(trigger)
                    {
                            case PSSSReceivedPSSyncRequest:
                                    fPortSyncSiteSyncTimeSyncState =
PSSSTSActive;
                                    break;
                            case PSInitialize:
                            case PSFaultDetected:
                            case PSDesignatedDisabled:
                                    fPortSyncSiteSyncTimeSyncState =
PSSSTSWaitingForInitialization;
                                    break;

default:
                                    DebugLog(" Invalid trigger for
PSSSTSSyncReceiptTimeout state, %d\n", trigger);
                    }
                    break;
    } updatePortSyncSiteSyncTimeSyncStateVariables();

FunctionExitLog
} void AppleAS::updatePortSyncSiteSyncTimeSyncStateVariables(
void )
{
    FunctionEntryLog("")

switch(fPortSyncSiteSyncTimeSyncState)
    {
            case PSSSTSWaitingForInitialization:
            case PSSSTSActive:
```

```
                case PSSSTSSendTSSyncRequest:
                case PSSSTSSendTSFollowUpRequest:
                case PSSSTSSyncReceiptTimeout:
                    break;
        }

FunctionExitLog
} pragma mark 802.1AS X.X.X State machine for
void AppleAS::portSyncTSMasterSelectionStateChanged(
PortSyncStateTrigger trigger )
{
        FunctionEntryLog("%d", trigger)

switch(fPortSyncTSMasterSelectionState)
        {
                case PSMSWaitingForInitialization:
                    switch(trigger)
                    {
                            case PSInitializationComplete:
                                    fPortSyncTSMasterSelectionState =
PSMSActive;
                                    break;
                            case PSInitialize:
                            case PSFaultDetected:
                            case PSDesignatedDisabled:
                                    fPortSyncTSMasterSelectionState =
PSMSWaitingForInitialization;
                                    break;

default:
                                    DebugLog("  Invalid trigger for
PSMSWaitingForInitialization state, %d\n", trigger);
                    }
                    break;
                case PSMSActive:
                    switch(trigger)
                    {
                            case PSTSReceivedTSAnnounceIndication:
                                    fPortSyncTSMasterSelectionState =
PSMSReceivedAnnounce;
                                    break;
                            case PSInitialize:
                            case PSFaultDetected:
                            case PSDesignatedDisabled:
```

```
                                fPortSyncTSMasterSelectionState =
PSMSWaitingForInitialization;
                                break;

default:
                                DebugLog("   Invalid trigger for
PSMSActive state, %d\n", trigger);
                        }
                        break;
                case PSMSReceivedAnnounce:
                        switch(trigger)
                        {
                                case PSTSReceivedTSAnnounceIndication:
                                fPortSyncTSMasterSelectionState =
PSMSActive;
                                break;
                        case PSInitialize:
                        case PSFaultDetected:
                        case PSDesignatedDisabled:
                                fPortSyncTSMasterSelectionState =
PSMSWaitingForInitialization;
                                break;

default:
                                DebugLog("   Invalid trigger for
PSMSReceivedAnnounce state, %d\n", trigger);
                        }
                        break;
        } updatePortSyncTSMasterSelectionStateVariables();

FunctionExitLog
} void AppleAS::updatePortSyncTSMasterSelectionStateVariables(
void )
{
        FunctionEntryLog("")

switch(fPortSyncSiteSyncMasterSelectionState)
        {
                case PSMSWaitingForInitialization:
                        break;
                case PSMSActive:
                        break;
```

```
                case PSMSReceivedAnnounce:
                    break;
        }

FunctionExitLog
} pragma mark 802.1AS X.X.X State machine for
void AppleAS::portSyncSiteSyncMasterSelectionStateChanged(
PortSyncStateTrigger trigger )
{
        FunctionEntryLog("%d", trigger)

switch(fPortSyncSiteSyncMasterSelectionState)
        {
                case PSMSWaitingForInitialization:
                        switch(trigger)
                        {
                                case PSInitializationComplete:

fPortSyncSiteSyncMasterSelectionState = PSMSActive;
                                        break;
                                case PSInitialize:
                                case PSFaultDetected:
                                case PSDesignatedDisabled:

fPortSyncSiteSyncMasterSelectionState =
PSMSWaitingForInitialization;
                                        break;

default:
                                        DebugLog("  Invalid trigger for
PSMSWaitingForInitialization state, %d\n", trigger);
                        }
                        break;
                case PSMSActive:
                        switch(trigger)
                        {
                                case PSSSPSReceivedAnnounceRequest:

fPortSyncSiteSyncMasterSelectionState =
PSMSReceivedAnnounce;
                                        break;
                                case PSInitialize:
                                case PSFaultDetected:
                                case PSDesignatedDisabled:
```

```
                fPortSyncSiteSyncMasterSelectionState =
PSMSWaitingForInitialization;
                        break;

default:
                        DebugLog("  Invalid trigger for
PSMSActive state, %d\n", trigger);
                    }
                    break;
            case PSMSReceivedAnnounce:
                switch(trigger)
                {
                    case PSSSPSReceivedAnnounceRequest:

fPortSyncSiteSyncMasterSelectionState = PSMSActive;
                        break;
                    case PSInitialize:
                    case PSFaultDetected:
                    case PSDesignatedDisabled:

fPortSyncSiteSyncMasterSelectionState =
PSMSWaitingForInitialization;
                        break;

default:
                        DebugLog("  Invalid trigger for
PSMSReceivedAnnounce state, %d\n", trigger);
                    }
                    break;
        } updatePortSyncSiteSyncMasterSelectionStateVariables();

FunctionExitLog
} void
AppleAS::updatePortSyncSiteSyncMasterSelectionStateVariables
( void )
{
        FunctionEntryLog("")

switch(fPortSyncSiteSyncMasterSelectionState)
        {
            case PSMSWaitingForInitialization:
```

```
                break;
        case PSMSActive:
                break;
        case PSMSReceivedAnnounce:
                break;
    }

FunctionExitLog
} pragma mark 802.1AS 11.3.1 State machine for receipt of
Sync and Follow_Up messages
void AppleAS::tsSyncFollowUpStateChanged(
PortSyncStateTrigger trigger )
{
    FunctionEntryLog("%d", trigger)

switch(fTSSyncFollowUpState)
    {
        case TSSFUWaitingForInitialization:
            switch(trigger)
            {
                case PSInitializationComplete:
                    fTSSyncFollowUpState = TSSFUActive;
                    break;

default:
                    DebugLog("  Invalid trigger for
TSSFUWaitingForInitialization state, %d\n", trigger);
            }
            break;
        case TSSFUActive:
            switch(trigger)
            {
                case PSInitialize:
                case PSFaultDetected:
                case PSDesignatedDisabled:
                    fTSSyncFollowUpState =
TSSFUWaitingForInitialization;
                    break;
                case PSTSSFUSyncReceived:
                    fTSSyncFollowUpState =
TSSFUWaitingForFollowUp;
                    break;

default:
```

```
                                DebugLog("  Invalid trigger for
TSSFUActive state, %d\n", trigger);
            }
            break;
        case TSSFUWaitingForFollowUp:
            switch(trigger)
            {
                case PSInitialize:
                case PSFaultDetected:
                case PSDesignatedDisabled:
                    fTSSyncFollowUpState =
TSSFUWaitingForInitialization;
                    break;
                case PSTSSFUFollowUpReceived:
                    fTSSyncFollowUpState =
TSSFUWaitingForSync;
                    break;
                case PSTimeout:
                    fTSSyncFollowUpState = TSSFUActive;
                    break;

default:
                    DebugLog("  Invalid trigger for
TSSFUWaitingForFollowUp state, %d\n", trigger);
            }
            break;
        case TSSFUWaitingForSync:
            switch(trigger)
            {
                case PSInitialize:
                case PSFaultDetected:
                case PSDesignatedDisabled:
                    fTSSyncFollowUpState =
TSSFUWaitingForInitialization;
                    break;
                case PSTSSFUSyncReceived:
                    fTSSyncFollowUpState =
TSSFUWaitingForFollowUp;
                    break;
                case PSTimeout:
                    fTSSyncFollowUpState = TSSFUActive;
                    break;

default:
                    DebugLog("  Invalid trigger for
TSSFUWaitingForSync state, %d\n", trigger);
```

```
                }
                break;
        }

FunctionExitLog
} pragma mark 802.1AS 11.3.4 State machine for sending
PDelay_req and receipt of Pdelay_Response and
Pdelay_Response_Follow_Up messages
void AppleAS::tsPDelayRequestStateChanged(
PortSyncStateTrigger trigger )
{
        //FunctionEntryLog("%d", trigger)

switch(fTSPDelayRequestState)
        {
                case TSPDRWaitingForInitialization:
                        switch(trigger)
                        {
                                case PSInitializationComplete:
                                        fTSPDelayRequestState =
TSPDRInitialize;
                                        break;

default:
                                        DebugLog("   Invalid trigger for
TSPDRWaitingForInitialization state, %d\n", trigger);
                        }
                        break;
                case TSPDRInitialize:
                        switch(trigger)
                        {
                                case PSFallthrough:
                                        fTSPDelayRequestState =
TSPDRSendRequest;
                                        break;
                                case PSInitialize:
                                case PSFaultDetected:
                                case PSDesignatedDisabled:
                                        fTSPDelayRequestState =
TSPDRWaitingForInitialization;
                                        break;

default:
                                        DebugLog("   Invalid trigger for
```

```
TSPDRInitialize state, %d\n", trigger);
            }
            break;
        case TSPDRReinitialize:
            switch(trigger)
            {
                case PSFallthrough:
                    fTSPDelayRequestState =
TSPDRSendRequest;
                    break;
                case PSInitialize:
                case PSFaultDetected:
                case PSDesignatedDisabled:
                    fTSPDelayRequestState =
TSPDRWaitingForInitialization;

default:
                    DebugLog("  Invalid trigger for
TSPDRReinitialize state, %d\n", trigger);
            }
            break;
        case TSPDRSendRequest:
            switch(trigger)
            {
                case PSTSPDRSendRequest:
                    fTSPDelayRequestState =
TSPDRWaitingForResponse;
                    break;
                case PSInitialize:
                case PSFaultDetected:
                case PSDesignatedDisabled:
                    fTSPDelayRequestState =
TSPDRWaitingForInitialization;
                    break;

default:
                    DebugLog("  Invalid trigger for
TSPDRSendRequest state, %d\n", trigger);
            }
            break;
        case TSPDRWaitingForResponse:
            switch(trigger)
            {
                case PSTSPDRResponseReceived:
                    fTSPDelayRequestState =
TSPDRWaitingForResponseFollowUp;
```

```
                            break;
                    case PSTimeout:
                            fTSPDelayRequestState =
TSPDRReinitialize;
                            break;
                    case PSInitialize:
                    case PSFaultDetected:
                    case PSDesignatedDisabled:
                            fTSPDelayRequestState =
TSPDRWaitingForInitialization;
                            break;
                            break;

default:
                            DebugLog("  Invalid trigger for
TSPDRWaitingForResponse state, %d\n", trigger);
                    }
                    break;
            case TSPDRWaitingForResponseFollowUp:
                    switch(trigger)
                    {
                    case PSTSPDRResponseFollowUpReceived:
                            fTSPDelayRequestState =
TSPDRWaitingForTimer;
                            break;
                    case PSTimeout:
                            fTSPDelayRequestState =
TSPDRReinitialize;
                            break;
                    case PSInitialize:
                    case PSFaultDetected:
                    case PSDesignatedDisabled:
                            fTSPDelayRequestState =
TSPDRWaitingForInitialization;
                            break;

default:
                            DebugLog("  Invalid trigger for
TSPDRWaitingForResponseFollowUp state, %d\n", trigger);
                    }
                    break;
            case TSPDRWaitingForTimer:
                    switch(trigger)
                    {
                    case PSTimeout:
                            fTSPDelayRequestState =
```

```
                TSPDRSendRequest;
                        break;
                case PSInitialize:
                case PSFaultDetected:
                case PSDesignatedDisabled:
                        fTSPDelayRequestState =
TSPDRWaitingForInitialization;

default:
                        DebugLog("  Invalid trigger for
TSPDRWaitingForTimer state, %d\n", trigger);
                }
                break;
        } updatePDelayRequestStateVariables();

//FunctionExitLog
} void AppleAS::updatePDelayRequestStateVariables( void )
{
        //FunctionEntryLog("")

switch(fTSPDelayRequestState)
        {
                case TSPDRWaitingForInitialization:
                        break;
                case TSPDRInitialize:
                        fLastPDelayRequestSequenceId = random();
                case TSPDRReinitialize:
                        fPDelayRateRatio = 1.0;
                        fPDelayRateRatioCounter = 0;
                        fDoneResponseCalc = false;
                        fPDelayRateRatioNumerator = 1;
                        fPDelayRateRatioDenominator = 1;
                        fMinMeanPropagationTime = UINT64_MAX;
                        fMaxMeanPropagationTime = 0;
                        fMeanMeanPropagationTime = 0;
                        fMeanMeanPropagationTerms = 0;
                        tsPDelayRequestStateChanged(PSFallthrough);
                        break;
                case TSPDRSendRequest:
                        sendPDelayRequest();
                        break;
                case TSPDRWaitingForTimer:
```

```
                //TODO: implement
                //FunctionEntryLog("")
                fPDelayRateRatioCounter++;
                if(fPDelayRateRatioCounter >=
k8021ASPDelayRateRationInterval || ! fDoneResponseCalc)
                {
                        if(fDoneResponseCalc)
                        {
                                fPDelayRateRatioNumerator =
fLastPDelayResponseEgressTime -
fOldCorrectedMasterEventTime;
                                fPDelayRateRatioDenominator =
fLastPDelayResponseIngressTime - fOldResponseIngressTime;
#if 0
                                DebugLog("
fLastPDelayResponseEgressTime %llu\n",
fLastPDelayResponseEgressTime);
                                DebugLog("
fOldCorrectedMasterEventTime %llu\n",
fOldCorrectedMasterEventTime);
                                DebugLog("
fPDelayRateRatioNumerator %llu\n",
fPDelayRateRatioNumerator);
#endif
                        }
                        else
                        {
                                fPDelayRateRatioNumerator = 1;
                                fPDelayRateRatioDenominator = 1;
                        } fDoneResponseCalc = true;
                        fOldCorrectedMasterEventTime =
fLastPDelayResponseEgressTime;
                        fOldResponseIngressTime =
fLastPDelayResponseIngressTime;
//                      fPDelayRateRatio =
(double)fPDelayRateRatioNumerator /
(double)fPDelayRateRatioDenominator;
                        fPDelayRateRatioCounter = 0;
                }

UInt64 requestIngress =
fLastPDelayRequestIngressTime +
(fLastPDelayResponseCorrection >> 16);
                UInt64 responseEgress =
```

```
fLastPDelayResponseEgressTime +
(fLastPDelayResponseFollowUpCorrection >> 16);

#if 0
                DebugLog("   fLastPDelayResponseIngressTime
%llu\n", fLastPDelayResponseIngressTime);
                DebugLog("   fLastPDelayRequestEgressTime
%llu\n", fLastPDelayRequestEgressTime);
                DebugLog("   fLastPDelayRequestIngressTime
%llu\n", fLastPDelayRequestIngressTime);
                DebugLog("   fLastPDelayResponseEgressTime
%llu\n", fLastPDelayResponseEgressTime);

DebugLog("   requestIngress %llu\n",
requestIngress);
                DebugLog("   responseEgress %llu\n",
responseEgress);

DebugLog("   fPDelayRateRatioNumerator
%llu\n", fPDelayRateRatioNumerator);
                DebugLog("   fPDelayRateRatioDenominator
%llu\n", fPDelayRateRatioDenominator);

DebugLog("   fLastPDelayResponseIngressTime -
fLastPDelayRequestEgressTime %llu\n",
fLastPDelayResponseIngressTime -
fLastPDelayRequestEgressTime);
                DebugLog("   responseEgress - requestIngress
%llu\n", responseEgress - requestIngress);
endif fMeanPropagationTime =
((fLastPDelayResponseIngressTime -
fLastPDelayRequestEgressTime) - ((fPDelayRateRatioNumerator
* (responseEgress - requestIngress)) /
fPDelayRateRatioDenominator)) / 2;

if(fMeanPropagationTime <
fMinMeanPropagationTime)
                {
                        fMinMeanPropagationTime =
fMeanPropagationTime;
                } if(fMeanPropagationTime >
fMaxMeanPropagationTime)
```

```
            {
                    fMaxMeanPropagationTime =
fMeanPropagationTime;
            } fMeanMeanPropagationTime +=
fMeanPropagationTime;
                    fMeanMeanPropagationTerms++;

#if 1
                    DebugLog("  Mean Propagation Time %06llu
%06llu %06llu %06llu\n", fMeanPropagationTime,
fMinMeanPropagationTime, fMeanMeanPropagationTime /
fMeanMeanPropagationTerms, fMaxMeanPropagationTime);
endif if 0
                    DebugLog("  %llu %llu %llu %llu %llu %llu
%llu %llu\n", fLastPDelayRequestEgressTime,
fLastPDelayRequestIngressTime,
fLastPDelayResponseEgressTime, fLastPDelayResponseIngressTime,
fLastPDelayResponseCorrection,
fLastPDelayResponseFollowUpCorrection,
fPDelayRateRatioNumerator, fPDelayRateRatioDenominator);
#endif
                    //FunctionExitLog
                    break;
        }

//FunctionExitLog
} pragma mark - pragma mark Timers void AppleAS::followUpTimeout(OSObject *owner,
IOTimerEventSource *sender)
{
        //TODO: Finish This
    AppleAS *appleAVBEthernet = OSDynamicCast( AppleAS,
owner );

if(appleAVBEthernet)
```

```
        {
            if(PSActive == appleAVBEthernet->fPortSyncState)
            {
                appleAVBEthernet-
>tsSyncFollowUpStateChanged(PSTimeout);
            }
        }
} void AppleAS::pDelayTimeout(OSObject *owner,
IOTimerEventSource *sender)
{
        //FunctionEntryLog("")

//TODO: Finish This
        AppleAS *appleAVBEthernet = OSDynamicCast( AppleAS,
owner );

if(appleAVBEthernet)
        {
            if(PSActive == appleAVBEthernet->fPortSyncState)
            {
                appleAVBEthernet-
>tsPDelayRequestStateChanged(PSTimeout);
            }
        }

//FunctionExitLog
} void AppleAS::lldpTimeout(OSObject *owner,
IOTimerEventSource *sender)
{
        //FunctionEntryLog("")

AppleAS *appleAVBEthernet = OSDynamicCast( AppleAS,
owner );

if(appleAVBEthernet)
        {
            if(PSActive == appleAVBEthernet->fPortSyncState)
            {
                appleAVBEthernet->transmitFrame((UInt8
*)&(appleAVBEthernet->fLLDPFrame), sizeof(abLLDPFrame));
                appleAVBEthernet->fLLDPTimer-
>setTimeoutMS(k8021ABTimeoutPeriod);
```

```
            }
        }

//FunctionExitLog
} void AppleAS::announceTimer(OSObject *owner,
IOTimerEventSource *sender)
{
        FunctionEntryLog("")

AppleAS *appleAVBEthernet = OSDynamicCast( AppleAS,
owner );

if(appleAVBEthernet)
        {
                UInt16 flags = 0;
                UInt16 stepsRemoved = 0;

UInt32 grandmasterClockAccuracy = 0xef;
                UInt32 grandmasterClass = 0xef;
                UInt32 grandmasterOffsetScaledLogVariance = 0;

UInt32 grandmasterClockQuality =
grandmasterClockAccuracy << 24 | grandmasterClass << 16 |
grandmasterOffsetScaledLogVariance;

UInt64 grandmasterIdentity =
OSSwapBigToHostInt64(*((UInt64 *)appleAVBEthernet->fEUI64));

appleAVBEthernet->sendAnnounce(appleAVBEthernet-
>fLastAnnounceSequenceId, flags,
k8021ASDefaultCurrentUTCOffest, k8021ASSourceNTP,
stepsRemoved, grandmasterIdentity, grandmasterClockQuality,
k8021ASGrandmasterPriority1, k8021ASGrandmasterPriority2);

sender-
>setTimeoutUS(k8021ASMeanIntervalUS(k8021ASAnnounceInterval)
);
        }

FunctionExitLog
} void AppleAS::syncTimer(OSObject *owner, IOTimerEventSource
*sender)
```

```
{
    FunctionEntryLog("")

AppleAS *appleAVBEthernet = OSDynamicCast( AppleAS,
owner );

if(appleAVBEthernet)
    {
        appleAVBEthernet->sendSyncRequest();
        sender-
>setTimeoutUS(k8021ASMeanIntervalUS(k8021ASSyncInterval));
    }

FunctionExitLog
} pragma mark Time Stamping
UInt64 AppleAS::frameNanoTimeStamp( void )
{
    AbsoluteTime absoluteTime;
    UInt64 nanos;

clock_get_uptime(&absoluteTime);
    absolutetime_to_nanoseconds(absoluteTime, &nanos);

#if 0
    DebugLog("    result %llu nanos %llu\n", absoluteTime,
nanos);
endif return nanos;
} asTimeStamp AppleAS::frameASTimeStamp( void )
{
    asTimeStamp result;

result = nanoToASTimeStamp(frameNanoTimeStamp());

return result;
} asTimeStamp AppleAS::nanoToASTimeStamp( UInt64 nanos )
{
    asTimeStamp result;
```

```
        UInt64 seconds = nanos / 1000000000ULL;
        UInt64 secnano = seconds * 1000000000ULL;
        UInt64 nanosecs = nanos - secnano;
        asTimeStampSetSeconds(&result, seconds);
        result.nanoseconds = nanosecs;

return result;
}

UInt64 AppleAS::asToNanoTimeStamp( asTimeStamp asTime )
{
        UInt64 result;
        UInt64 nanosecs = asTime.nanoseconds;
        result = nanosecs + (1000000000ULL *
asTimeStampGetSeconds(asTime));

return result;
} pragma mark Frame Building void AppleAS::setEtherFrameHeader(etherFrameHeader *header,
UInt8 destMAC[kIOEthernetAddressSize], UInt16 etherType)
{
        memcpy(header->destMAC, destMAC,
kIOEthernetAddressSize);
        memcpy(header->sourceMAC, fSourceMAC,
kIOEthernetAddressSize);

header->etherType = OSSwapHostToBigInt16(etherType);
} void AppleAS::setEtherQFrameHeader(etherQFrameHeader
*header, UInt8 destMAC[kIOEthernetAddressSize], UInt16 tpid,
UInt8 pcp, UInt8 cfi, UInt16 vid, UInt16 etherType)
{
        memcpy(header->destMAC, destMAC,
kIOEthernetAddressSize);
        memcpy(header->sourceMAC, fSourceMAC,
kIOEthernetAddressSize);

header->tpid = OSSwapHostToBigInt16(tpid);
        header->pcp = pcp;
        header->cfi = cfi;
        header->vid = OSSwapHostToBigInt16(vid);
        header->etherType = OSSwapHostToBigInt16(etherType);
```

```
} void AppleAS::setASFrameHeader(asMessageFrameHeader *header,
UInt8 messageType, UInt16 messageLength, UInt16 flags,
UInt16 sequenceId, UInt8 control, UInt8 logMeanInterval)
{
    header->transportSpecific = k8021ASTransportSpecific;
    header->messageType = messageType;
    header->versionPTP = k8021ASVersionPTP;

header->messageLength =
OSSwapHostToBigInt16(messageLength);

//802.1AS 8.1 specifies that we only support domain 0
    header->domainNumber = 0;

header->flags = OSSwapHostToBigInt16(flags |
k8021ASFlagsTwoStep);
    header->correctionField = 0;

header->sourcePortIdentity =
OSSwapHostToBigASPortIdentity(fSourcePortIdentity);

header->sequenceId = OSSwapHostToBigInt16(sequenceId);
    header->control = control;
    header->logMeanMessageInterval = logMeanInterval;
} void AppleAS::setASAnnounceFrame(asAnnounceFrame *frame,
UInt16 sequenceId, UInt16 flags, UInt16 currentUTCOffset,
UInt8 timeSource, UInt16 stepsRemoved, UInt64
grandmasterIdentity, UInt32 grandmasterClockQuality, UInt8
grandmasterPriority1, UInt8 grandmasterPriority2)
{
    bzero(frame, sizeof(asSyncFrame));

setEtherFrameHeader(&(frame->etherHeader),
asReservedMulticastAddress, k8021ASEtherType);

setASFrameHeader(&(frame->asHeader),
k8021ASAnnounceFrameType, k8021ASAnnounceFrameLength, flags,
sequenceId, k8021ASAnnounceControl,
k8021ASLogMeanMessageIntervalReserved);

frame->currentUTCOffset =
OSSwapHostToBigInt16(currentUTCOffset);
```

```
        frame->timeSource = timeSource;
        frame->stepsRemoved =
OSSwapHostToBigInt16(stepsRemoved);
        frame->grandmasterIdentity =
OSSwapHostToBigInt64(grandmasterIdentity);
        frame->grandmasterClockQuality =
OSSwapHostToBigInt32(grandmasterClockQuality);
        frame->grandmasterPriority1 = grandmasterPriority1;
        frame->grandmasterPriority2 = grandmasterPriority2;
} void AppleAS::setASSyncFrame(asSyncFrame *frame, UInt16
sequenceId)
{
        bzero(frame, sizeof(asSyncFrame));

setEtherFrameHeader(&(frame->etherHeader),
asReservedMulticastAddress, k8021ASEtherType);

setASFrameHeader(&(frame->asHeader),
k8021ASSyncFrameType, k8021ASSyncFrameLength, 0, sequenceId,
k8021ASSyncControl, k8021ASLogMeanMessageIntervalReserved);
} void AppleAS::setASFollowUpFrame(asFollowUpFrame *frame,
asTimeStamp timeStamp, UInt16 sequenceId)
{
        bzero(frame, sizeof(asFollowUpFrame));

setEtherFrameHeader(&(frame->etherHeader),
asReservedMulticastAddress, k8021ASEtherType);

setASFrameHeader(&(frame->asHeader),
k8021ASFollowUpFrameType, k8021ASFollowUpFrameLength, 0,
sequenceId, k8021ASFollowUpControl,
k8021ASLogMeanMessageIntervalReserved);
        frame->preciseOriginTimestamp =
OSSwapHostToBigASTimeStamp(timeStamp);
} void AppleAS::setASPDelayRequestFrame(asPDelayRequestFrame
*frame, UInt16 sequenceId)
{
        bzero(frame, sizeof(asPDelayRequestFrame));

setEtherFrameHeader(&(frame->etherHeader),
```

```
asReservedMulticastAddress, k8021ASEtherType);

setASFrameHeader(&(frame->asHeader),
k8021ASPDelayRequestFrameType,
k8021ASPDelayRequestFrameLength, 0, sequenceId,
k8021ASPDelayReqControl,
k8021ASLogMeanMessageIntervalReserved);
} void AppleAS::setASPDelayResponseFrame(asPDelayResponseFrame
*frame, UInt16 sequenceId, asTimeStamp receivedTimestamp,
asPortIdentity receivedPortIdentity)
{
    bzero(frame, sizeof(asPDelayResponseFrame));

setEtherFrameHeader(&(frame->etherHeader),
asReservedMulticastAddress, k8021ASEtherType);

setASFrameHeader(&(frame->asHeader),
k8021ASPDelayResponseFrameType,
k8021ASPDelayResponseFrameLength, 0, sequenceId,
k8021ASPDelayResponseControl,
k8021ASLogMeanMessageIntervalReserved);

frame->requestReceiptTimestamp =
OSSwapHostToBigASTimeStamp(receivedTimestamp);
    frame->requestingPortIdentity =
OSSwapHostToBigASPortIdentity(receivedPortIdentity);
} void
AppleAS::setASPDelayResponseFollowUpFrame(asPDelayResponseFo
llowUpFrame *frame, UInt16 sequenceId, asTimeStamp
originResponseTimestamp, asPortIdentity
receivedPortIdentity)
{
    bzero(frame, sizeof(asPDelayResponseFollowUpFrame));

setEtherFrameHeader(&(frame->etherHeader),
asReservedMulticastAddress, k8021ASEtherType);

setASFrameHeader(&(frame->asHeader),
k8021ASPDelayResponseFollowUpFrameType,
k8021ASPDelayResponseFollowUpFrameLength, 0, sequenceId,
k8021ASPDelayResponseFollowUpControl,
k8021ASLogMeanMessageIntervalReserved);
```

```
      frame->requestReceiptTimestamp =
OSSwapHostToBigASTimeStamp(originResponseTimestamp);
      frame->requestingPortIdentity =
OSSwapHostToBigASPortIdentity(receivedPortIdentity);
} pragma mark Incoming Frame Handling void AppleAS::handleReceivedAnnounceFrame(asAnnounceFrame
*frame, UInt64 receivedTime)
{
      FunctionEntryLog("%p, %llu", frame, receivedTime)
      if(PSActive == fPortSyncState)
      {
            //TODO: Finish This
            fLastAnnounceIndication.sequenceId =
OSSwapBigToHostInt16(frame->asHeader.sequenceId);
            fLastAnnounceIndication.grandmasterPriority1 =
frame->grandmasterPriority1;
            fLastAnnounceIndication.grandmasterClass;
/////////////////////////////////////////////////////////////
///
            fLastAnnounceIndication.grandmasterClockAccuracy;
/////////////////////////////////////////////////////////////
/// fLastAnnounceIndication.grandmasterOffsetScaledLogVaria
nce = frame->asHeader.logMeanMessageInterval;
            fLastAnnounceIndication.grandmasterPriority2 =
frame->grandmasterPriority2;
            fLastAnnounceIndication.grandmasterIdentity =
OSSwapBigToHostInt64(frame->grandmasterIdentity);
            fLastAnnounceIndication.stepsRemoved =
OSSwapBigToHostInt16(frame->stepsRemoved);
            fLastAnnounceIndication.receiverIdentity;
/////////////////////////////////////////////////////////////
///
            fLastAnnounceIndication.senderIdentity =
OSSwapBigToHostASPortIdentity(frame-
>asHeader.sourcePortIdentity);
            fLastAnnounceIndication.currentUTCOffset =
OSSwapBigToHostInt16(frame->currentUTCOffset);

UInt16 flags = OSSwapBigToHostInt16(frame-
>asHeader.flags);
```

```
            fLastAnnounceIndication.currentUTCOffsetValid =
flags & k8021ASFlagsCurrentUTCOffsetValid ? true : false;
            fLastAnnounceIndication.leap59 = flags &
k8021ASFlagsLeap59 ? true : false;
            fLastAnnounceIndication.leap61 = flags &
k8021ASFlagsLeap61 ? true : false;
            fLastAnnounceIndication.timeTraceable = flags &
k8021ASFlagsTimeTraceable ? true : false;
            fLastAnnounceIndication.frequencyTraceable = flags
& k8021ASFlagsFrequencyTraceable ? true : false;

fLastAnnounceIndication.timeSource = frame-
>timeSource;

//fAppleAS-
>announceReceived(fLastAnnounceIndication);

portSyncTSTimeSyncStateChanged(PSTSReceivedTSSyncIndica
tion);
    }
    FunctionExitLog
} void AppleAS::handleReceivedSyncFrame(asSyncFrame *frame,
UInt64 receivedTime)
{
    FunctionEntryLog("%p, %llu", frame, receivedTime)
    if(PSActive == fPortSyncState)
    {
        fSyncFollowUpTimeout-
>setTimeoutUS(k8021ASMeanIntervalUS(k8021ASSyncInterval));

///Do something with frame
        fLastSyncIndication.localPortNumber = fPortNumber;
        fLastSyncIndication.sourcePortIdentity =
OSSwapBigToHostASPortIdentity(frame-
>asHeader.sourcePortIdentity);
        fLastSyncIndication.sequenceId =
OSSwapBigToHostInt16(frame->asHeader.sequenceId);
        fLastSyncIndication.logMeanMessageInterval =
frame->asHeader.logMeanMessageInterval;
        fLastSyncIndication.rxTime = receivedTime;

//fAppleAS->syncReceived(fLastSyncIndication);
```

```
            tsSyncFollowUpStateChanged(PSTSSFUSyncReceived);
        }
        FunctionExitLog
} void AppleAS::handleReceivedFollowUpFrame(asFollowUpFrame
*frame, UInt64 receivedTime)
{
        FunctionEntryLog("%p, %llu", frame, receivedTime)
        if(PSActive == fPortSyncState &&
TSSFUWaitingForFollowUp == fTSSyncFollowUpState)
        {
                if(OSSwapBigToHostInt16(frame-
>asHeader.sequenceId) == fLastSyncIndication.sequenceId)
                {
                        fLastSyncIndication.followUpCorrectionField =
OSSwapBigToHostInt64(frame->asHeader.correctionField);
                        fLastSyncIndication.preciseOriginTimestamp =
OSSwapBigToHostASTimeStamp(frame->preciseOriginTimestamp);

//Send it on up!!!!
                        //TODO: send it up fSyncFollowUpTimeout->cancelTimeout();

tsSyncFollowUpStateChanged(PSTSSFUFollowUpReceived);
                }
        }
        FunctionExitLog
} void
AppleAS::handleReceivedPDelayRequestFrame(asPDelayRequestFra
me *frame, UInt64 receivedTime)
{
        //FunctionEntryLog("%p, %llu", frame, receivedTime)

if(PSActive == fPortSyncState)
        {
                asPortIdentity receivedPortIdentity =
OSSwapBigToHostASPortIdentity(frame-
>asHeader.sourcePortIdentity);
                asTimeStamp receivedTimestamp =
nanoToASTimeStamp(receivedTime);

asPDelayResponseFrame responseFrame;
```

```
        setASPDelayResponseFrame(&responseFrame,
OSSwapBigToHostConstInt16(frame->asHeader.sequenceId),
receivedTimestamp, receivedPortIdentity);

transmitFrame((UInt8 *)&responseFrame,
sizeof(asPDelayRequestFrame));

//Get sent time
        //TODO: need to get real time that packet was
sent.

asTimeStamp transmitTime = frameASTimeStamp();

asPDelayResponseFollowUpFrame
responseFollowUpFrame;

setASPDelayResponseFollowUpFrame(&responseFollowUpFrame
, OSSwapBigToHostConstInt16(frame->asHeader.sequenceId),
transmitTime, receivedPortIdentity);

transmitFrame((UInt8 *)&responseFollowUpFrame,
sizeof(asPDelayResponseFollowUpFrame));
     }

//FunctionExitLog
} void
AppleAS::handleReceivedPDelayResponseFrame(asPDelayResponseF
rame *frame, UInt64 receivedTime)
{
    //FunctionEntryLog("%p, %llu", frame, receivedTime)

if(PSActive == fPortSyncState)
    { if(OSSwapBigToHostInt16(frame-
>asHeader.sequenceId) == fLastPDelayRequestSequenceId)
        {
            fLastPDelayResponseIngressTime =
receivedTime;
            fLastPDelayRequestIngressTime =
asToNanoTimeStamp(OSSwapBigToHostASTimeStamp(frame-
>requestReceiptTimestamp));
            fLastPDelayResponseCorrection =
OSSwapBigToHostInt64(frame->asHeader.correctionField);
```

```
            tsPDelayRequestStateChanged(PSTSPDRResponseReceived);
            }
      }
      //FunctionExitLog
} void
AppleAS::handleReceivedPDelayResponseFollowUpFrame(asPDelayR
esponseFollowUpFrame *frame, UInt64 receivedTime)
{
      //FunctionEntryLog("%p, %llu", frame, receivedTime)

if(PSActive == fPortSyncState)
      {
            if(OSSwapBigToHostInt16(frame-
>asHeader.sequenceId) == fLastPDelayRequestSequenceId)
            {
                  fLastPDelayResponseEgressTime =
asToNanoTimeStamp(OSSwapBigToHostASTimeStamp(frame-
>requestReceiptTimestamp));
                  fLastPDelayResponseFollowUpCorrection =
OSSwapBigToHostInt64(frame->asHeader.correctionField);

tsPDelayRequestStateChanged(PSTSPDRResponseFollowUpRece
ived);
            }
      }
      //FunctionExitLog
} void AppleAS::handleReceivedLLDPFrame(UInt8 *frame)
{
#if 0
      FunctionEntryLog("%p", frame)

UInt8 *llpdu = frame + 14; //skip the dest MAC src MAC
and ethertype

//process llpdu
      bool reachedEnd = false;

while(!reachedEnd)
      {
            UInt8 tlvType = *llpdu;
            llpdu++;
```

```
            UInt16 tlvLength = ((UInt16)*llpdu) | (
((UInt16)(tlvType & 0x01)) << 8 );
            llpdu++;
            tlvType = tlvType >> 1;

UInt16 i;

switch(tlvType)
            {
                case 0: //End of LLPDU
                    DebugLog("  End Of LLPDU\n");
                    reachedEnd = true;
                    break;
                case 1:
                    DebugLog("  Chassis ID\n");
                    DebugLog("  Chassis subtype 0x%02x\n",
llpdu[0]);
                    DebugLog("  Chassis ID: 0x");
                    for(i = 1; i < tlvLength; i++)
                    {
                        DebugLog("%02x", llpdu[i]);
                    }
                    DebugLog("\n");
                    DebugLog("  Chassis ID: \"");
                    for(i = 1; i < tlvLength; i++)
                    {
                        DebugLog("%c", llpdu[i]);
                    }
                    DebugLog("\"\n");

break;
                case 2:
                    DebugLog("  Port ID\n");
                    DebugLog("  Port subtype 0x%02x\n",
llpdu[0]);
                    DebugLog("  Port ID: 0x");
                    for(i = 1; i < tlvLength; i++)
                    {
                        DebugLog("%02x", llpdu[i]);
                    }
                    DebugLog("\n");

break;
                case 3:
                    DebugLog("  Time To Live\n");
                    DebugLog("  TTL: %u\n",
```

```
OSSwapBigToHostInt16(*((UInt16 *)llpdu)));

break;
        case 4:
                DebugLog("  Port Description\n");
                DebugLog("  Port Description: 0x");
                for(i = 0; i < tlvLength; i++)
                {
                        DebugLog("%02x", llpdu[i]);
                }
                DebugLog("\n");

break;
        case 5:
                DebugLog("  System Name\n");
                DebugLog("  System Name: ");
                for(i = 0; i < tlvLength; i++)
                {
                        DebugLog("%c", llpdu[i]);
                }
                DebugLog("\n");

break;
        case 6:
                DebugLog("  System Description\n");
                DebugLog("  System Description: 0x");
                for(i = 0; i < tlvLength; i++)
                {
                        DebugLog("%02x", llpdu[i]);
                }
                DebugLog("\n");

break;
        case 7:
                DebugLog("  System Capabilities\n");
                UInt16 systemCapabilities =
OSSwapBigToHostInt16(*((UInt16 *)llpdu));
                UInt16 enabledCapabailities
OSSwapBigToHostInt16(((UInt16 *)llpdu)[1]);
                DebugLog("  System Capabilities:
0x%04x\n", systemCapabilities);
                DebugLog("  Enabled Capabilities:
0x%04x\n", enabledCapabailities);

break;
        case 8:
```

```
                    DebugLog("  Managment Address\n");
                    DebugLog("  Managment Address: 0x");
                    for(i = 0; i < tlvLength; i++)
                    {
                        DebugLog("%02x", llpdu[i]);
                    }
                    DebugLog("\n");

break;
                case 127:
                    DebugLog("  Organizationally Specific
TLV\n");
                    DebugLog("  Organizationally Specific:
0x");
                    for(i = 0; i < tlvLength; i++)
                    {
                        DebugLog("%02x", llpdu[i]);
                    }
                    DebugLog("\n");
//                  DebugLog("  Organizationally Specific:
");
//                  for(i = 0; i < tlvLength; i++)
//                  {
//                      DebugLog("%c", llpdu[i]);
//                  }
//                  DebugLog("\n");

break;
                default:
                    DebugLog("  Unknown TLV type %u\n",
tlvType);
            } llpdu += tlvLength;
        }

FunctionExitLog
#endif
} pragma mark Outgoing Frames

IOReturn AppleAS::sendPDelayRequest( void )
{
    IOReturn result = kIOReturnSuccess;
```

```
        fLastPDelayRequestSequenceId++;

asPDelayRequestFrame frame;
    setASPDelayRequestFrame(&frame,
fLastPDelayRequestSequenceId);

result = transmitFrame((UInt8 *)&frame,
sizeof(asPDelayRequestFrame));

if(kIOReturnSuccess == result)
    {
        fLastPDelayRequestEgressTime =
frameNanoTimeStamp();
        tsPDelayRequestStateChanged(PSTSPDRSendRequest);
        fPDelayTimeout-
>setTimeoutUS(k8021ASMeanIntervalUS(k8021ASPDelayReqInterval
));
        //DebugLog("   timeout %llu\n",
k8021ASMeanIntervalUS(k8021ASPDelayReqInterval));
    } return result;
}

IOReturn AppleAS::sendSyncRequest( void )
{
    IOReturn result = kIOReturnSuccess;

fLastSyncSequenceId++;

asSyncFrame syncFrame;
    setASSyncFrame(&syncFrame, fLastSyncSequenceId);

result = transmitFrame((UInt8 *)&syncFrame,
sizeof(asSyncFrame));

if(kIOReturnSuccess == result)
    {
        asTimeStamp transmitTime = frameASTimeStamp();

asFollowUpFrame followUpFrame;
        setASFollowUpFrame(&followUpFrame, transmitTime,
fLastSyncSequenceId);

result = transmitFrame((UInt8 *)&followUpFrame,
sizeof(asFollowUpFrame));
```

```
        } return result;
}

IOReturn AppleAS::sendAnnounce(UInt16 sequenceId, UInt16
flags, UInt16 currentUTCOffset, UInt8 timeSource, UInt16
stepsRemoved, UInt64 grandmasterIdentity, UInt32
grandmasterClockQuality, UInt8 grandmasterPriority1, UInt8
grandmasterPriority2)
{
        asAnnounceFrame announceFrame;

setASAnnounceFrame(&announceFrame, sequenceId, flags,
currentUTCOffset, timeSource, stepsRemoved,
grandmasterIdentity, grandmasterClockQuality,
grandmasterPriority1, grandmasterPriority2);

return transmitFrame((UInt8 *)&announceFrame,
sizeof(asAnnounceFrame));
} pragma mark Network Interface

IOReturn AppleAS::openNetworkInterface( void )
{
        IOReturn result = kIOReturnError;
        errno_t error;

FunctionEntryLog("")

error = ifnet_find_by_name( fIFName,
&fNetworkInterface);

if(error)
        {
                DebugLog("  error creating interface %d\n",
error);
        }
        else
        {
                struct sockaddr_dl awsMultiAddr;

bzero( &awsMultiAddr, sizeof( awsMultiAddr ) );
```

```
        awsMultiAddr.sdl_len = sizeof( awsMultiAddr );
        awsMultiAddr.sdl_family = AF_LINK;
        awsMultiAddr.sdl_type = IFT_ETHER;
        awsMultiAddr.sdl_alen = kIOEthernetAddressSize;
        awsMultiAddr.sdl_index = ifnet_index(
fNetworkInterface );

memcpy( LLADDR( &awsMultiAddr ),
asReservedMulticastAddress, kIOEthernetAddressSize );

ifnet_add_multicast( fNetworkInterface, (const
struct sockaddr *)&awsMultiAddr, &fInterfaceASMulticast );

iff_filter filter;

filter.iff_cookie = this;
        filter.iff_name = "AppleFireWireAVBBridge";
        filter.iff_protocol = PF_UNSPEC;
        filter.iff_input = filterInputCallback;
        filter.iff_output = NULL;
        filter.iff_event = filterEventCallback;
        filter.iff_ioctl = NULL;
        filter.iff_detached = filterDetachedCallback;

error = iflt_attach(fNetworkInterface, &filter,
&fInterfaceFilter);
        if(error)
        {
            DebugLog("  error creating filter %d\n",
error);
        }
        result = kIOReturnSuccess;
    }

FunctionIOReturnExitLog(result)

return result;
}

IOReturn AppleAS::closeNetworkInterface( void )
{
    FunctionEntryLog("")

if(fNetworkInterface)
    {
        if(fInterfaceFilter)
```

```
        {
                iflt_detach(fInterfaceFilter);
        } ifnet_release(fNetworkInterface);
        fNetworkInterface = NULL;
    }

FunctionExitLog return kIOReturnSuccess;
} pragma mark Interface Filter errno_t AppleAS::filterInputCallback(void* cookie, ifnet_t
interface, protocol_family_t protocol, mbuf_t *data, char
**frame_ptr)
{
    //FunctionEntryLog("%p, %p, %d, %p, %p", cookie,
interface, protocol, data, frame_ptr)

errno_t result = 0;
    etherFrameHeader *frameHeader = (etherFrameHeader
*)*frame_ptr;
    AppleAS *appleAVBEthernet = (AppleAS *)cookie;
    UInt16 etherType = OSSwapBigToHostInt16(frameHeader-
>etherType);

if(k8021ASEtherType == etherType)
    {
#if DUMP_PACKET
        DebugLog("   802.1AS Frame\n");
        DebugLog("   interface header length: %d\n",
ifnet_hdrlen(interface));
        DebugLog("   frame_ptr %p mbuf_data %p\n",
*frame_ptr, mbuf_data(*data));
        UInt8 *debugFrameData = (UInt8 *)(*frame_ptr);
        UInt32 frameLength = sizeof(etherFrameHeader) +
mbuf_len(*data);
        for(unsigned int i = 0; i < frameLength; i++)
        {
            if(i % 8 == 0 && i != 0)
                DebugLog("\n");
            DebugLog("%02x ", debugFrameData[i]);
        }
```

```
            DebugLog("\n");
endif asMessageFrameHeader *asHeader =
(asMessageFrameHeader *)mbuf_data(*data);

UInt64 receivedTimestamp = appleAVBEthernet-
>frameNanoTimeStamp();

switch(asHeader->messageType)
            {
                case k8021ASAnnounceFrameType:
                    appleAVBEthernet-
>handleReceivedAnnounceFrame((asAnnounceFrame *)*frame_ptr,
receivedTimestamp);
                    break;
                case k8021ASSyncFrameType:
                    appleAVBEthernet-
>handleReceivedSyncFrame((asSyncFrame *)*frame_ptr,
receivedTimestamp);
                    break;
                case k8021ASFollowUpFrameType:
                    appleAVBEthernet-
>handleReceivedFollowUpFrame((asFollowUpFrame *)*frame_ptr,
receivedTimestamp);
                    break;
                case k8021ASPDelayRequestFrameType:
                    appleAVBEthernet-
>handleReceivedPDelayRequestFrame((asPDelayRequestFrame
*)*frame_ptr, receivedTimestamp);
                    break;
                case k8021ASPDelayResponseFrameType:
                    appleAVBEthernet-
>handleReceivedPDelayResponseFrame((asPDelayResponseFrame
*)*frame_ptr, receivedTimestamp);
                    break;
                case k8021ASPDelayResponseFollowUpFrameType:
                    appleAVBEthernet-
>handleReceivedPDelayResponseFollowUpFrame((asPDelayResponse
FollowUpFrame *)*frame_ptr, receivedTimestamp);
                    break;
                default:
                    DebugLog("Unknown message type %x\n",
asHeader->messageType);
            }
```

```
            result = EJUSTRETURN;
    }
    else if(k8021ABEtherType == etherType)
    {
#if DUMP_PACKET
        DebugLog("   802.1AB Frame\n");
        DebugLog("   interface header length: %d\n",
ifnet_hdrlen(interface));
        DebugLog("   frame_ptr %p mbuf_data %p\n",
*frame_ptr, mbuf_data(*data));
        UInt8 *debugFrameData = (UInt8 *)(*frame_ptr);
        UInt32 frameLength = sizeof(etherFrameHeader) +
mbuf_len(*data);
        for(unsigned int i = 0; i < frameLength; i++)
        {
            if(i % 8 == 0 && i != 0)
                DebugLog("\n");
            DebugLog("%02x ", debugFrameData[i]);
        }
        DebugLog("\n");
endif
#if 1
        appleAVBEthernet->handleReceivedLLDPFrame((UInt8
*)(*frame_ptr));
#endif
    }
#if 0
    else if(k8021AVBEtherType == etherType)
    {
        DebugLog("   802.1 AVB Frame\n");
#if DUMP_PACKET
        DebugLog("   interface header length: %d\n",
ifnet_hdrlen(interface));
        DebugLog("   frame_ptr %p mbuf_data %p\n",
*frame_ptr, mbuf_data(*data));
        UInt8 *debugFrameData = (UInt8 *)(*frame_ptr);
        UInt32 frameLength = sizeof(etherFrameHeader) +
mbuf_len(*data);
        for(unsigned int i = 0; i < frameLength; i++)
        {
            if(i % 8 == 0 && i != 0)
                DebugLog("\n");
            DebugLog("%02x ", debugFrameData[i]);
        }
        DebugLog("\n");
endif
```

```
        }
endif
    else
        {
            DebugLog("   not an AS or AB or AVB Frame %04x\n",
etherType);
#if DUMP_PACKET
            DebugLog("   not an AS or AB or AVB Frame\n");
            DebugLog("   interface header length: %d\n",
ifnet_hdrlen(interface));
            DebugLog("   frame_ptr %p mbuf_data %p\n",
*frame_ptr, mbuf_data(*data));
            UInt8 *debugFrameData = (UInt8 *)(*frame_ptr);
            UInt32 frameLength = sizeof(etherFrameHeader) +
mbuf_len(*data);
            for(unsigned int i = 0; i < frameLength; i++)
            {
                if(i % 8 == 0 && i != 0)
                    DebugLog("\n");
                DebugLog("%02x ", debugFrameData[i]);
            }
            DebugLog("\n");
endif
        }

//FunctionExitLog
    return result;
} void AppleAS::filterEventCallback(void* cookie, ifnet_t
interface, protocol_family_t protocol, const struct kev_msg
*event_msg)
{
    FunctionEntryLog("%p, %p, %d, %p", cookie, interface,
protocol, event_msg)

DebugLog("   vendor_code 0x%08x\n", event_msg-
>vendor_code);
    DebugLog("   kev_class 0x%08x\n", event_msg->kev_class);
    DebugLog("   kev_subclass 0x%08x\n", event_msg-
>kev_subclass);
    DebugLog("   event_code 0x%08x\n", event_msg-
>event_code);

FunctionExitLog
}
```

```
void AppleAS::filterDetachedCallback(void* cookie, ifnet_t
interface)
{
    FunctionEntryLog("%p, %p, %d, %p", cookie, interface)

AppleAS *appleAVBEthernet = (AppleAS *)cookie;

appleAVBEthernet-
>portSyncStateChanged(PSDesignatedDisabled);

FunctionExitLog
} define kProtocolFamily 0x66

IOReturn AppleAS::transmitFrame( UInt8 *frameData, UInt32
frameLength )
{
    IOReturn result = kIOReturnError;

mbuf_t enetFrame;
    unsigned int maxchunks = 1;

mbuf_allocpacket(MBUF_DONTWAIT, frameLength,
&maxchunks, &enetFrame);

mbuf_copyback(enetFrame, 0 , frameLength, frameData,
MBUF_DONTWAIT);

mbuf_setlen(enetFrame, frameLength);

if(mbuf_len(enetFrame) != frameLength)
    {
        DebugLog("  frame length not match %d %d\n",
mbuf_len(enetFrame), frameLength);
    } if DUMP_PACKET
    UInt8 *debugFrameData = (UInt8 *)mbuf_data(enetFrame);

for(unsigned int i = 0; i < frameLength; i++)
    {
        if(i % 8 == 0 && i != 0)
            DebugLog("\n");
        DebugLog("%02x ", debugFrameData[i]);
```

```
        }
        DebugLog("\n");
endif errno_t err = ifnet_output_raw(fNetworkInterface,
kProtocolFamily, enetFrame);

if(err)
        {
                DebugLog("  Error sending mbuf %d\n", err);
                DebugLog(" %p %x %p\n", fNetworkInterface,
kProtocolFamily, enetFrame);
        }
        else
        {
                result = kIOReturnSuccess;
        } return result;
}
```

What is claimed is:

1. A method for sending a message from a source device to a target device via a fabric, wherein the source device operates with a first protocol, and the fabric operates with a second protocol, the first and second protocols being different, the method comprising:
  associating the source device with a software entity, where the software entity comprises a remote network daemon configured to handle device capability discovery;
  associating the target device with the software entity;
  responsive to the associations of the source device and the target device, negotiating one or more parameters related to data stream requirements, the negotiating comprising:
    the software entity providing a first one or more parameters of the source device to the target device; and
    the software entity providing a second one or more parameters of the target device to the source device;
  based on the negotiating, the source device formatting at least one message to be compliant with the second protocol, and the negotiated one or more parameters; and
  transmitting the formatted at least one message via the fabric;
  wherein the negotiation comprises a process that is logically separated from the transmission of the formatted at least one message, the logical separation characterized by routing the at least one message without the software entity.

2. The method of claim 1, wherein the source device and fabric are characterized by isochronous transfer parameters.

3. The method of claim 2, wherein the source device and the target device exchange audio data.

4. The method of claim 2, wherein the source device and the target device exchange video data.

5. The method of claim 1, wherein the source and target devices negotiate a connection via the fabric, based at least in part on the first and second one or more parameters.

6. The method of claim 1, wherein the first protocol comprises an IEEE 1394-compliant protocol.

7. The method of claim 1, wherein the second protocol comprises an IEEE 802.1-compliant protocol.

8. A system operative to send a message over a fabric compliant with a first protocol, the system comprising:
  a source device, the source device configured to communicate via a second protocol, the second protocol being different from the first protocol;
  at least one target device; and
  a network entity, the network entity being associated with the source device and the at least one target device, the network entity configured to manage one or more parameters associated with each of the source and the at least one target device;
  wherein the network entity is further configured to negotiate one or more protocol requirements based at least in part on the one or more parameters; and
  wherein based at least in part on the negotiation, the source device routes a data stream to the at least one target device independently of the network entity, and where the data stream is formatted for at least the requirements of the first protocol.

9. The system of claim 8, wherein the fabric is configured to transact isochronous and asynchronous data streams.

10. The system of claim 9, wherein the source device and the at least one target device are configured to exchange isochronous data.

11. The system of claim 8, wherein the fabric is configured to transact audio data streams.

12. The system of claim 8, wherein the first protocol comprises an IEEE 802.1-compliant protocol.

13. The system of claim 12, wherein the second protocol comprises a serial-bus protocol.

14. The system of claim 13, wherein the serial-bus protocol comprises an IEEE 1394-compliant protocol.

15. The system of claim 8, wherein the network entity comprises a network daemon.

16. A non-transitory computer-readable apparatus configured to store at least one computer program for connection management thereon, the at least one computer program comprising a plurality of instructions configured to, when executed;
  associate with a source device able to communicate via a first protocol;
  associate with a target device operatively connected to the source device via a fabric compliant with a second protocol, the second protocol being different from the first protocol;
  receive parameters from each of the devices related to the protocols;
  based at least in part on the parameters, negotiate one or more requirements for a data stream; and
  transmit the one or more requirements to at least the source device;
  wherein the transmission of the one or more requirements causes the source device to format at least a portion of a message in compliance with the second protocol; and
  wherein the message is transmitted via the fabric based at least in part on a datastream management entity, the datastream management entity being logically independent from the at least one computer program for connection management.

17. The apparatus of claim 16, wherein the at least one computer program comprises a network daemon.

18. The apparatus of claim 16, wherein the message comprises audio data.

19. The apparatus of claim 16, wherein:
  at least one of the associations is facilitated via an asynchronous data stream; and
  the message is sent via an isochronous data stream.

* * * * *